United States Patent
Iizawa

(10) Patent No.: US 11,797,886 B2
(45) Date of Patent: Oct. 24, 2023

(54) IMAGE PROCESSING DEVICE, IMAGE PROCESSING METHOD, AND IMAGE PROCESSING PROGRAM

(71) Applicant: NEC Corporation, Tokyo (JP)

(72) Inventor: Yohei Iizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 606 days.

(21) Appl. No.: 17/043,319

(22) PCT Filed: Mar. 5, 2019

(86) PCT No.: PCT/JP2019/008581
§ 371 (c)(1),
(2) Date: Sep. 29, 2020

(87) PCT Pub. No.: WO2019/188040
PCT Pub. Date: Oct. 3, 2019

(65) Prior Publication Data
US 2021/0019878 A1     Jan. 21, 2021

(30) Foreign Application Priority Data
Mar. 29, 2018  (JP) .................................. 2018-064097

(51) Int. Cl.
*G06T 7/00*   (2017.01)
*G06N 20/00*   (2019.01)
(Continued)

(52) U.S. Cl.
CPC ........... *G06N 20/00* (2019.01); *G06F 18/214* (2023.01); *G06T 7/001* (2013.01); *G06T 7/0008* (2013.01);
(Continued)

(58) Field of Classification Search
CPC ..... G06N 20/00; G06F 18/214; G06T 7/0008; G06T 7/001; G06T 2207/20081;
(Continued)

(56) References Cited

U.S. PATENT DOCUMENTS

| | | | |
|---|---|---|---|
| 2003/0093251 A1* | 5/2003 | Chang ...................... | G03F 1/84 430/5 |
| 2007/0202476 A1* | 8/2007 | Williamson ..... | G01N 21/95607 434/236 |
| 2011/0299759 A1* | 12/2011 | Shi ........................... | G03F 1/84 382/144 |

FOREIGN PATENT DOCUMENTS

| | | |
|---|---|---|
| JP | H05-149728 A | 6/1993 |
| JP | 2005-156334 A | 6/2005 |

(Continued)

OTHER PUBLICATIONS

International Search Report for PCT Application No. PCT/JP2019/008581, dated Jun. 11, 2019.

*Primary Examiner* — Jonathan M Hansen
(74) *Attorney, Agent, or Firm* — Sughrue Mion, PLLC

(57) ABSTRACT

An image processing device 500 includes: a normal image acquisition means 501 which acquires a normal image including an object for inspection in a normal condition; an anomaly simulated image generation means 502 which inserts, into the normal image, a simulated image of an anomaly feature of the object for inspection in an anomaly condition to generate an anomaly simulated image; and a model learning means 503 which, using the normal image and the anomaly simulated image, learns a reproduction model for generating, from part of an image containing the object for inspection, a reproduction image is an image including at least a predetermined region of the object for inspection in which the predetermined region in a normal condition is reproduced.

10 Claims, 12 Drawing Sheets

(51) Int. Cl.
  *G06F 18/214* (2023.01)
  *G06V 10/774* (2022.01)
  *G06V 10/98* (2022.01)
  *G06V 20/00* (2022.01)

(52) U.S. Cl.
  CPC .......... *G06V 10/774* (2022.01); *G06V 10/993* (2022.01); *G06V 20/00* (2022.01); *G06T 2207/20081* (2013.01); *G06T 2207/30108* (2013.01)

(58) Field of Classification Search
  CPC . G06T 2207/30108; G06T 2207/20084; G06T 2207/30164; G06V 10/774; G06V 10/993; G06V 20/00
  See application file for complete search history.

(56) References Cited

FOREIGN PATENT DOCUMENTS

| | | |
|---|---|---|
| JP | 2011-214903 A | 10/2011 |
| JP | 2016-181068 A | 10/2016 |
| JP | 2017-211259 A | 11/2017 |

* cited by examiner

FIG. 3
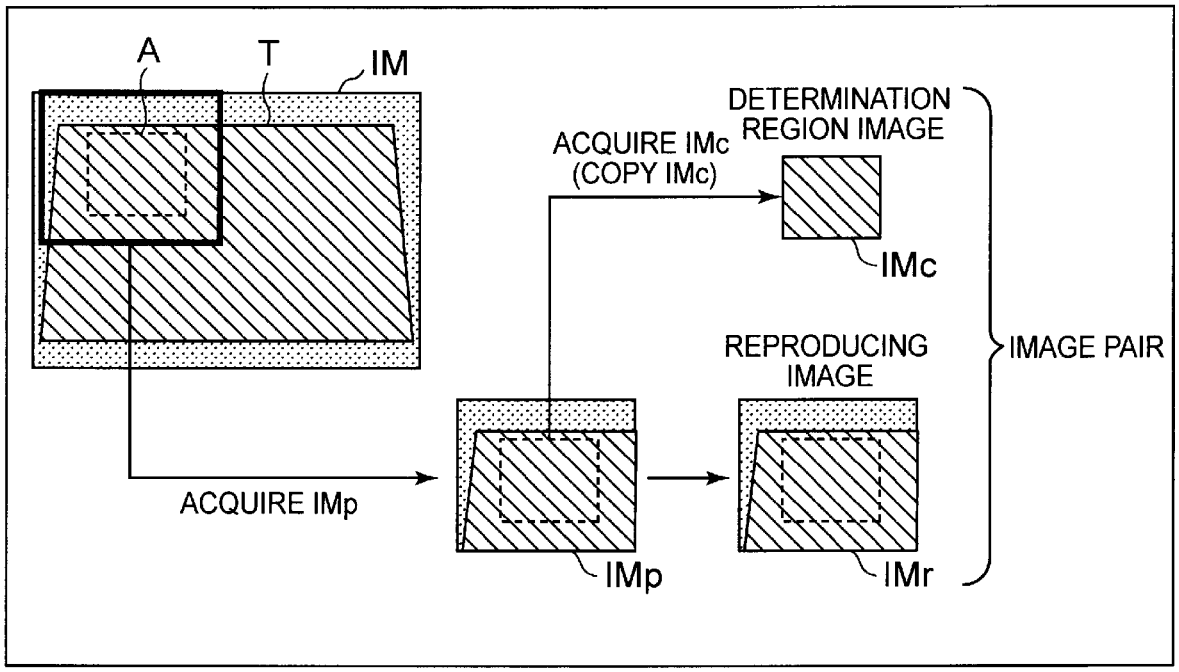
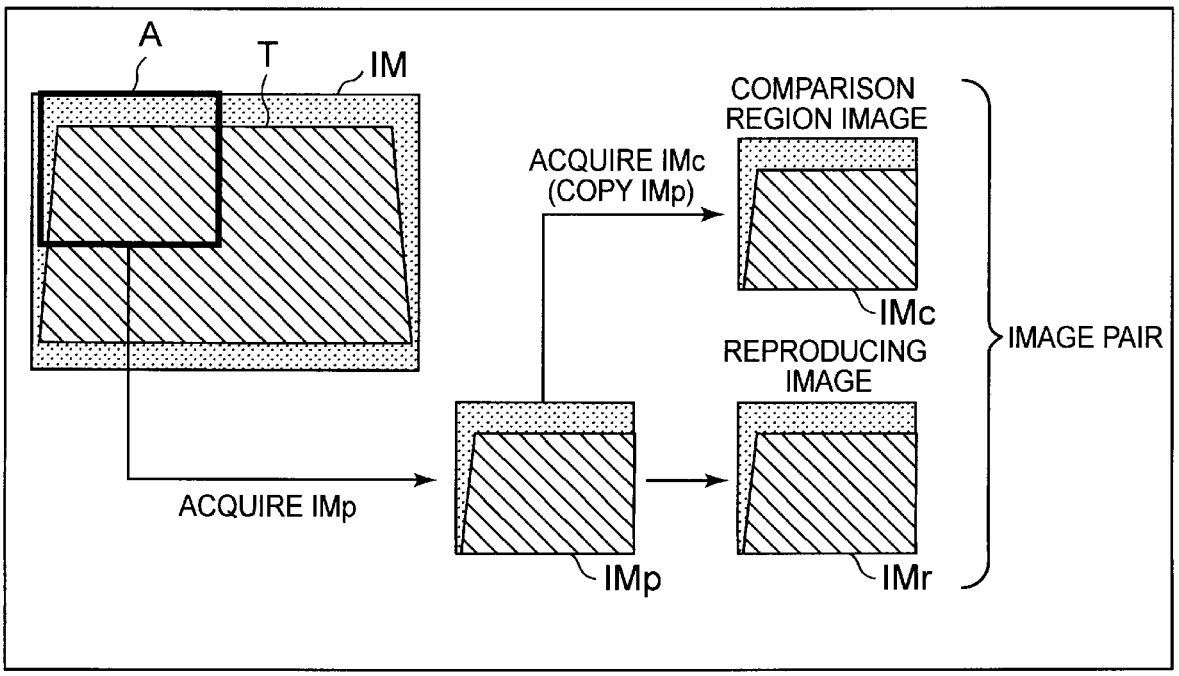

FIG. 4
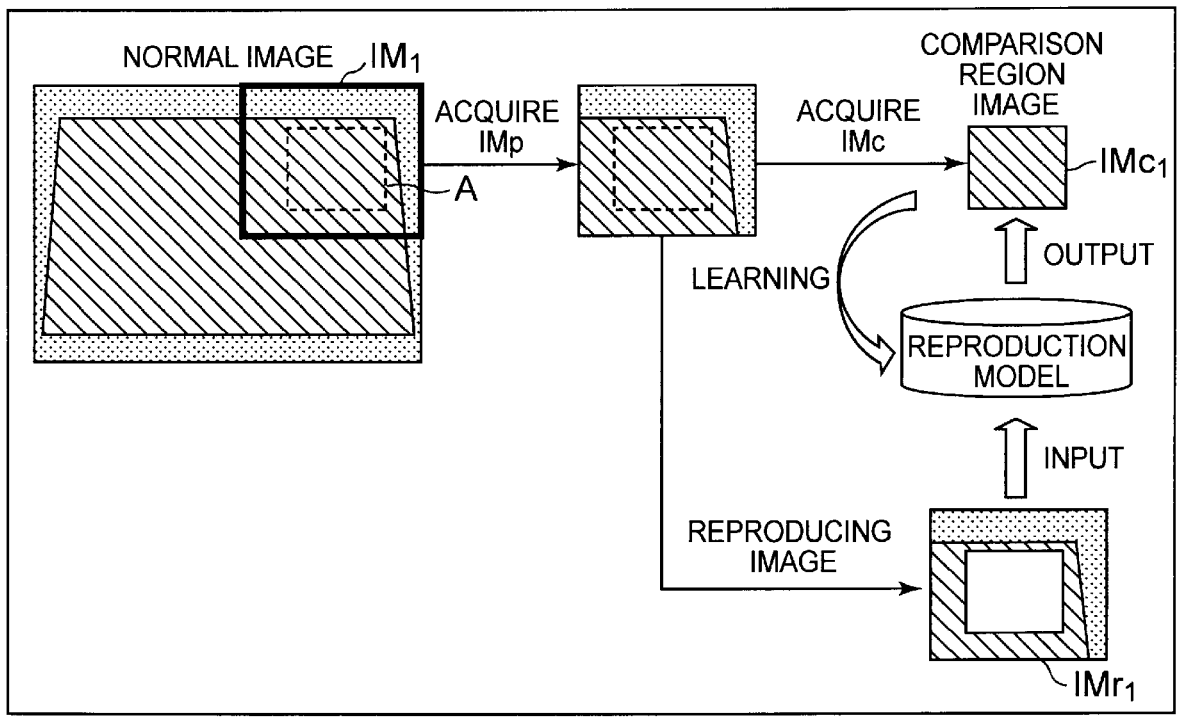
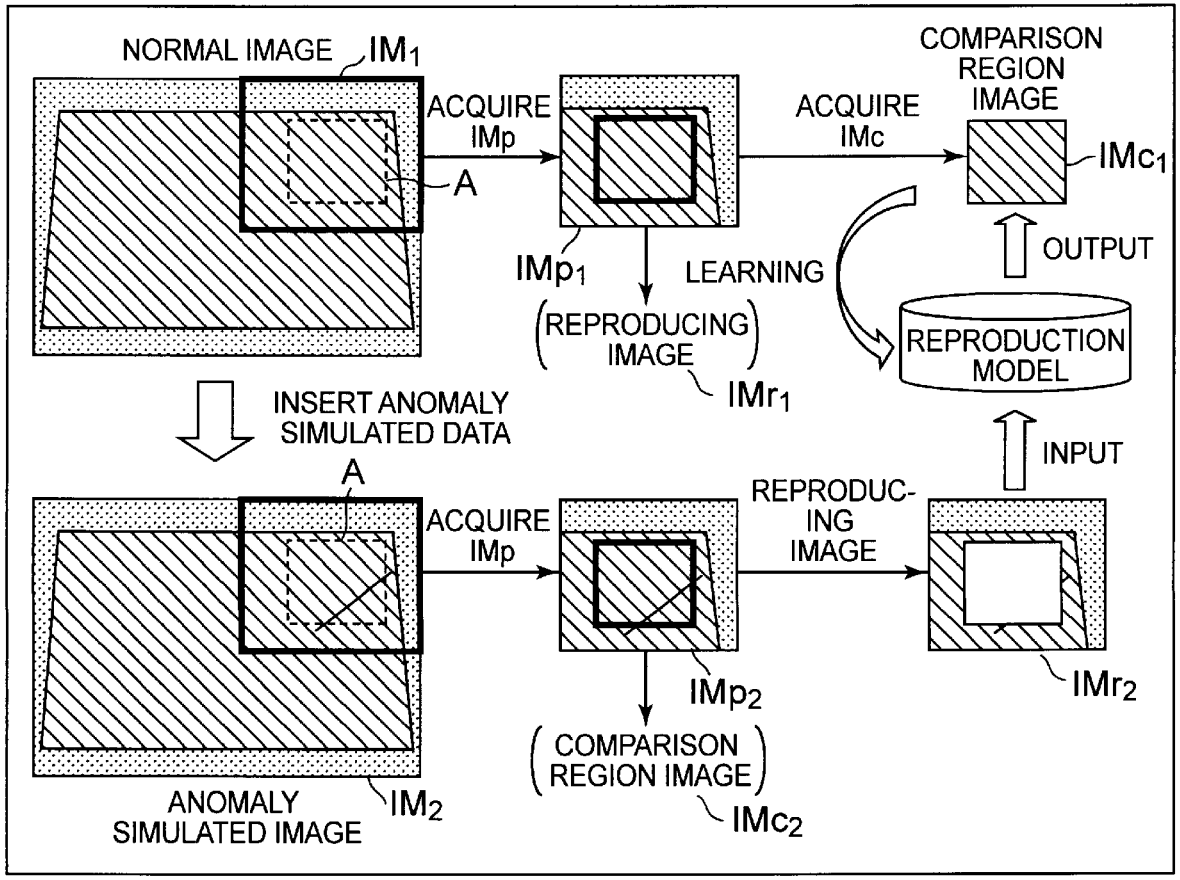

FIG. 5
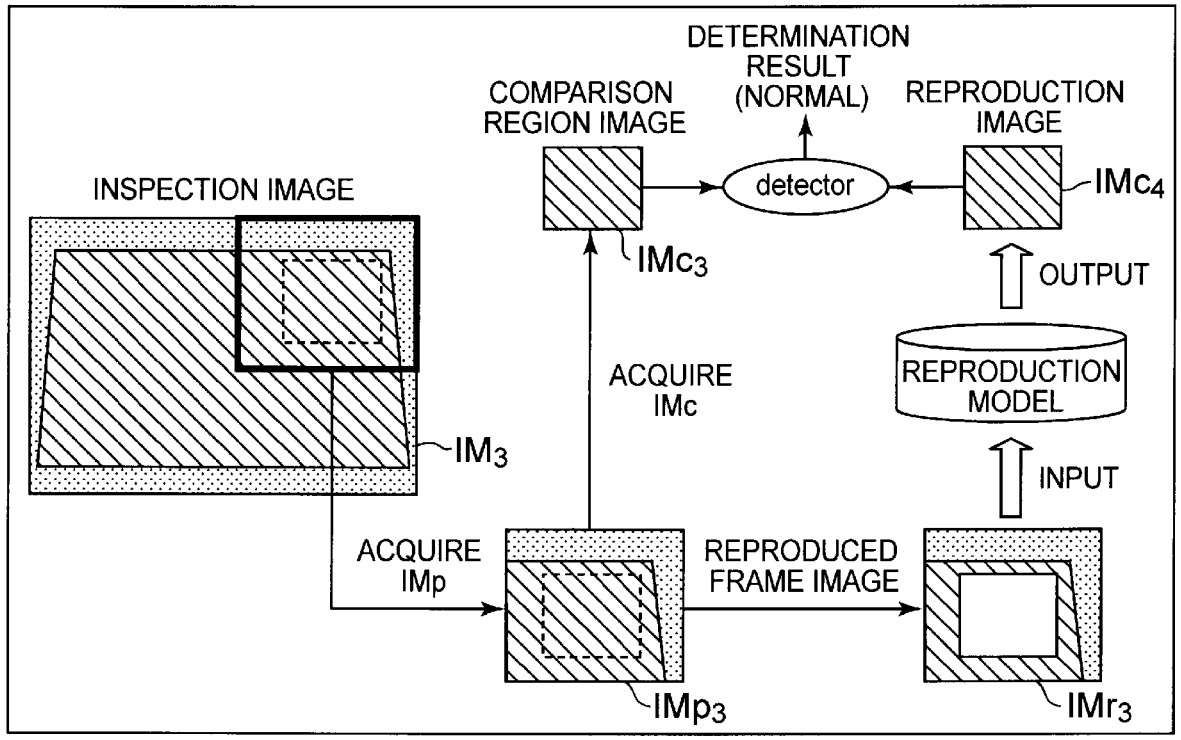
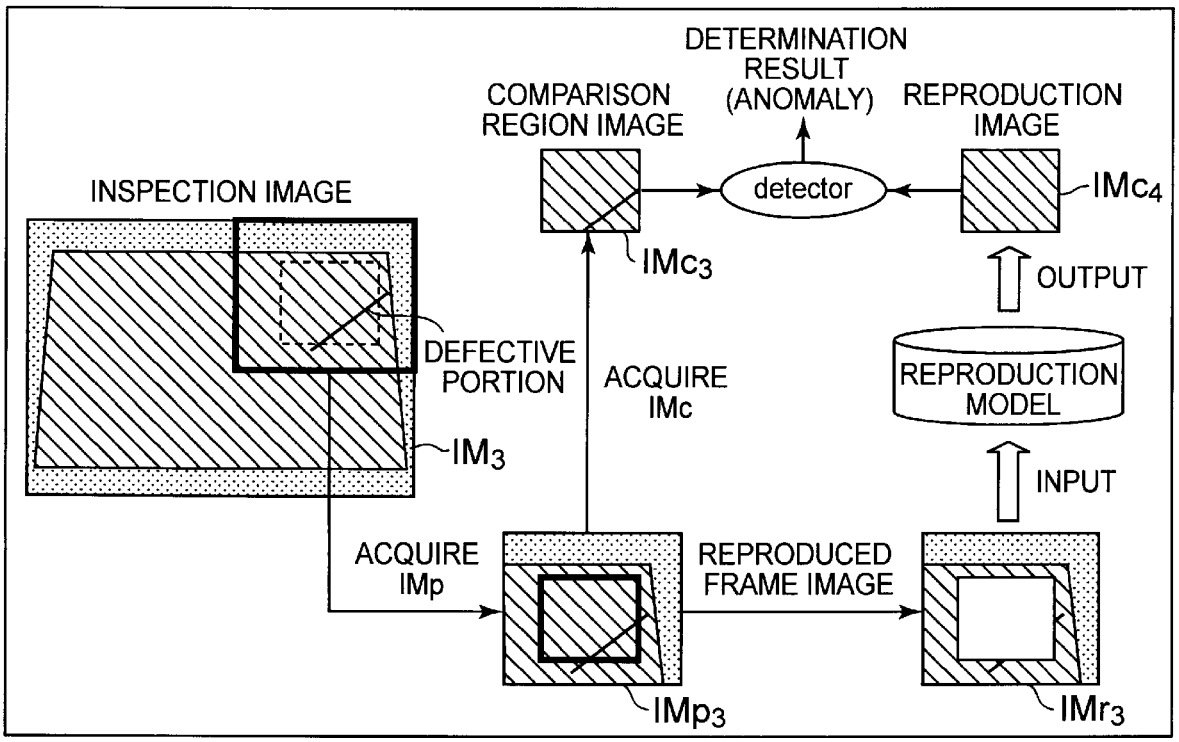

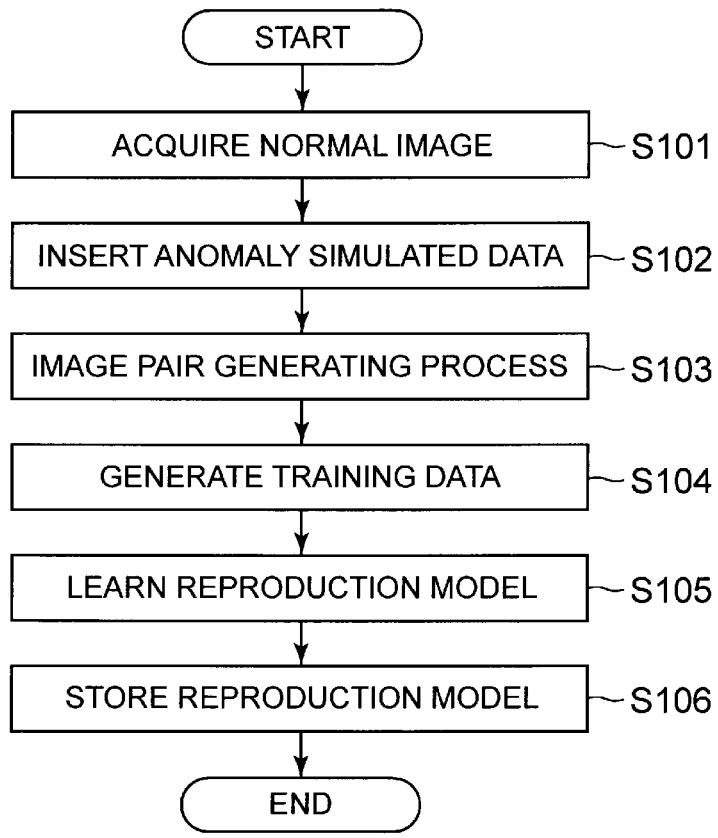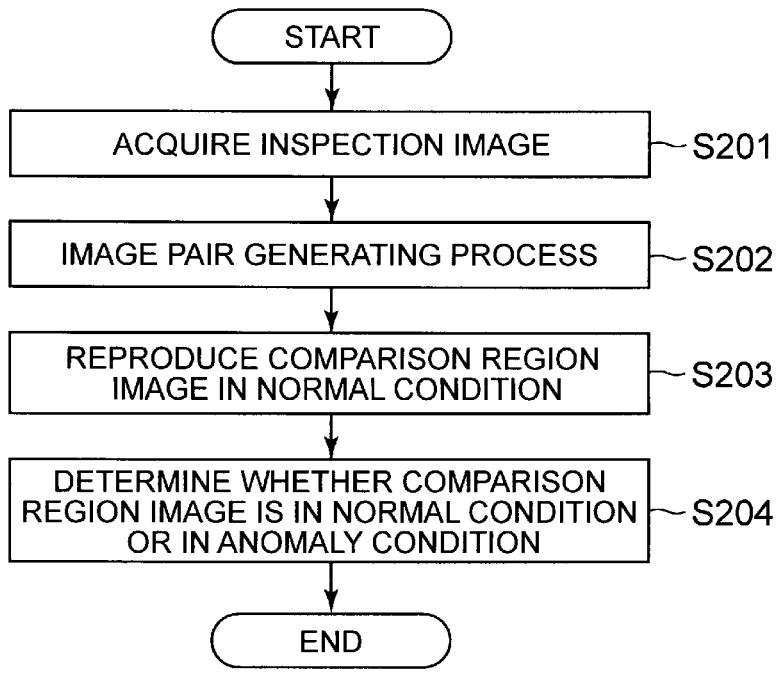

FIG. 10
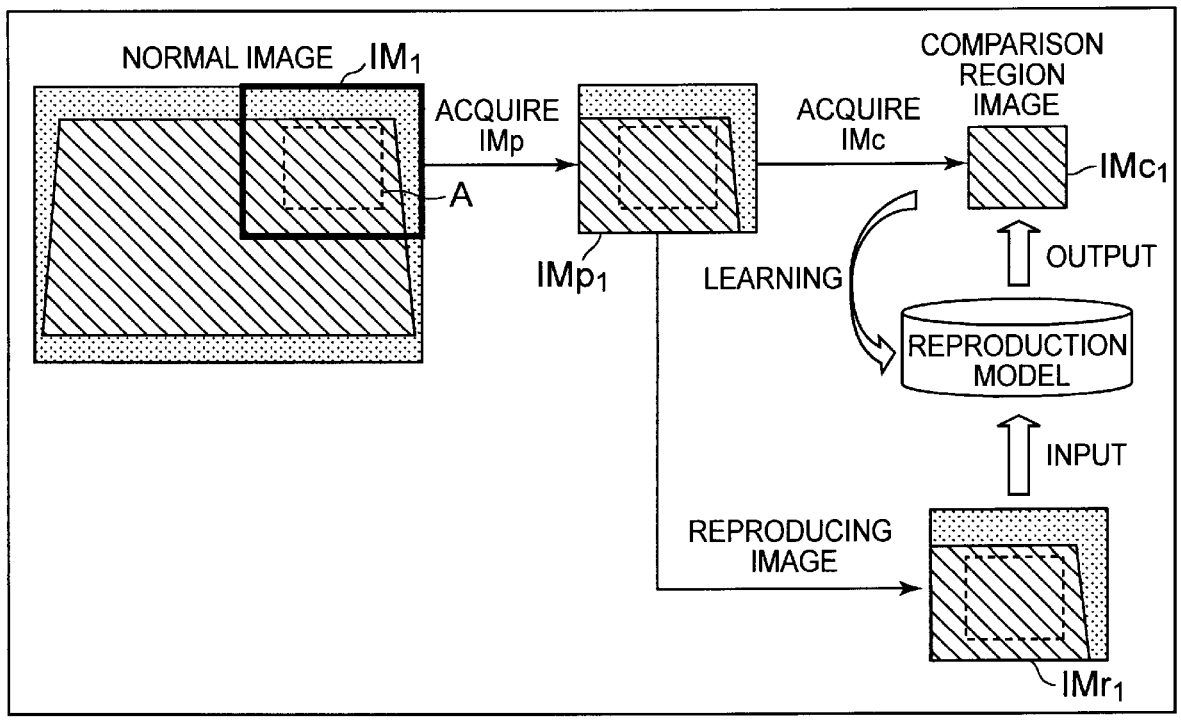
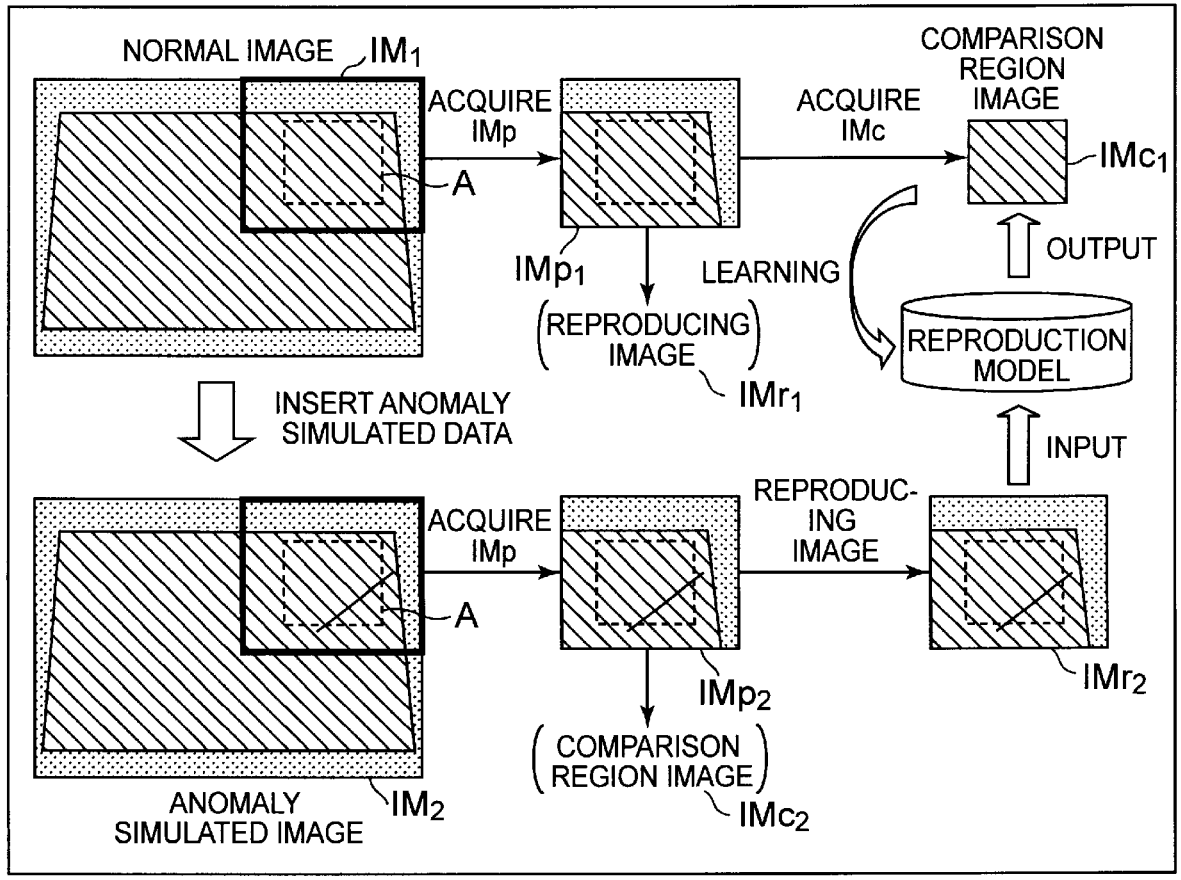

FIG. 11
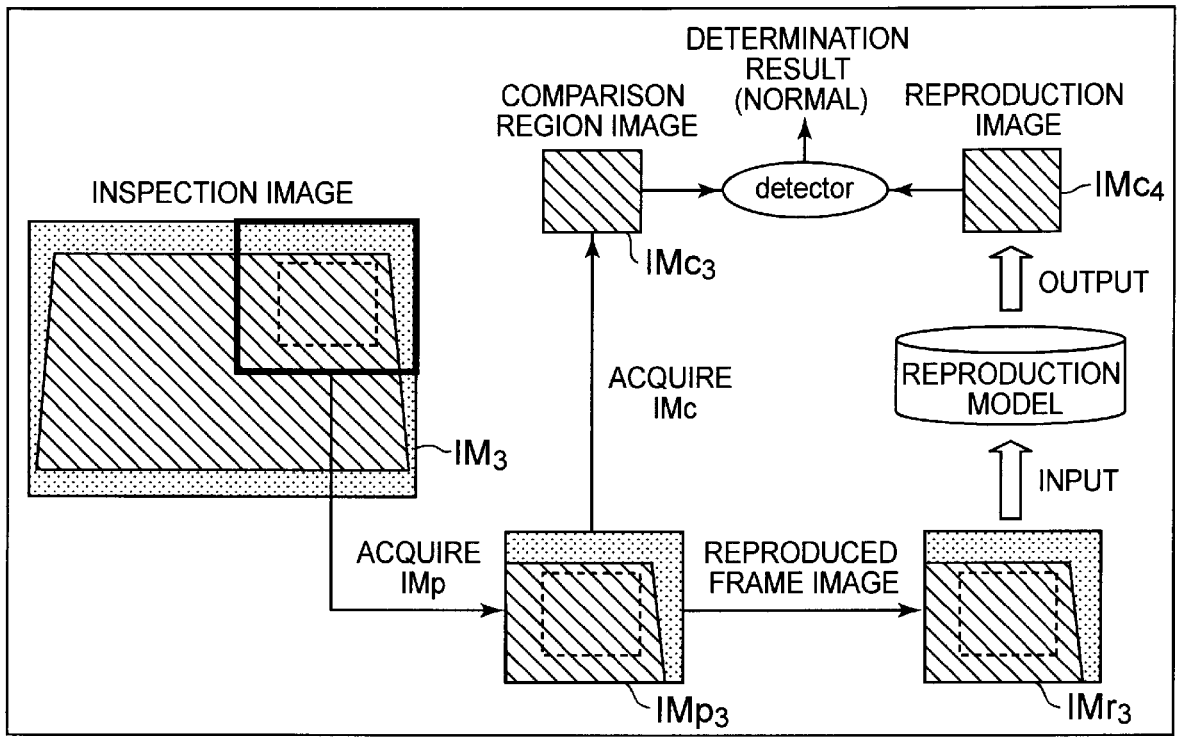
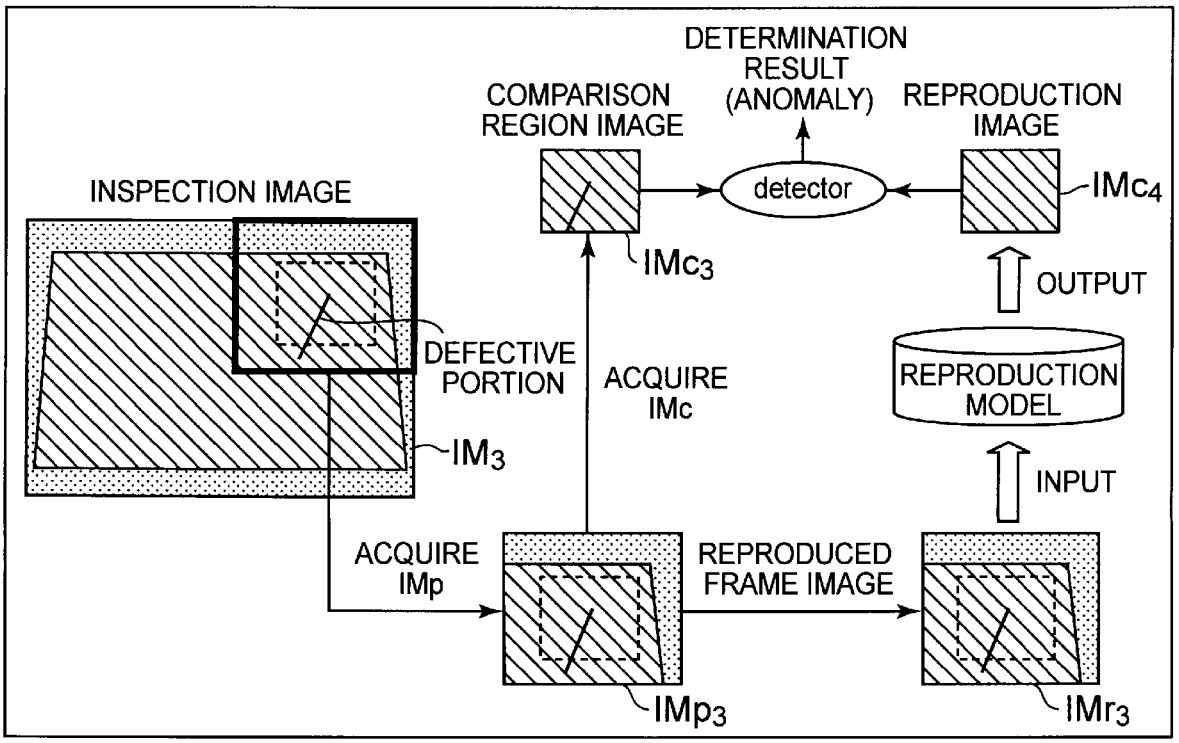

FIG. 13
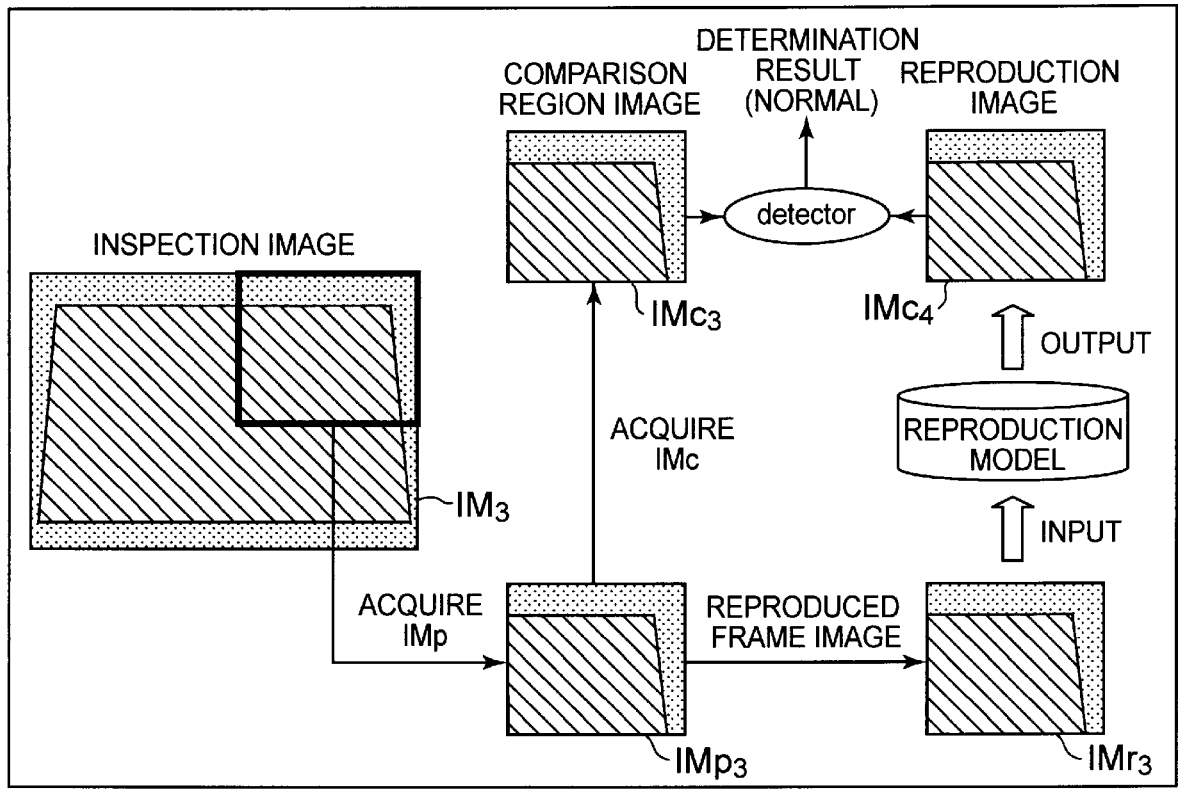
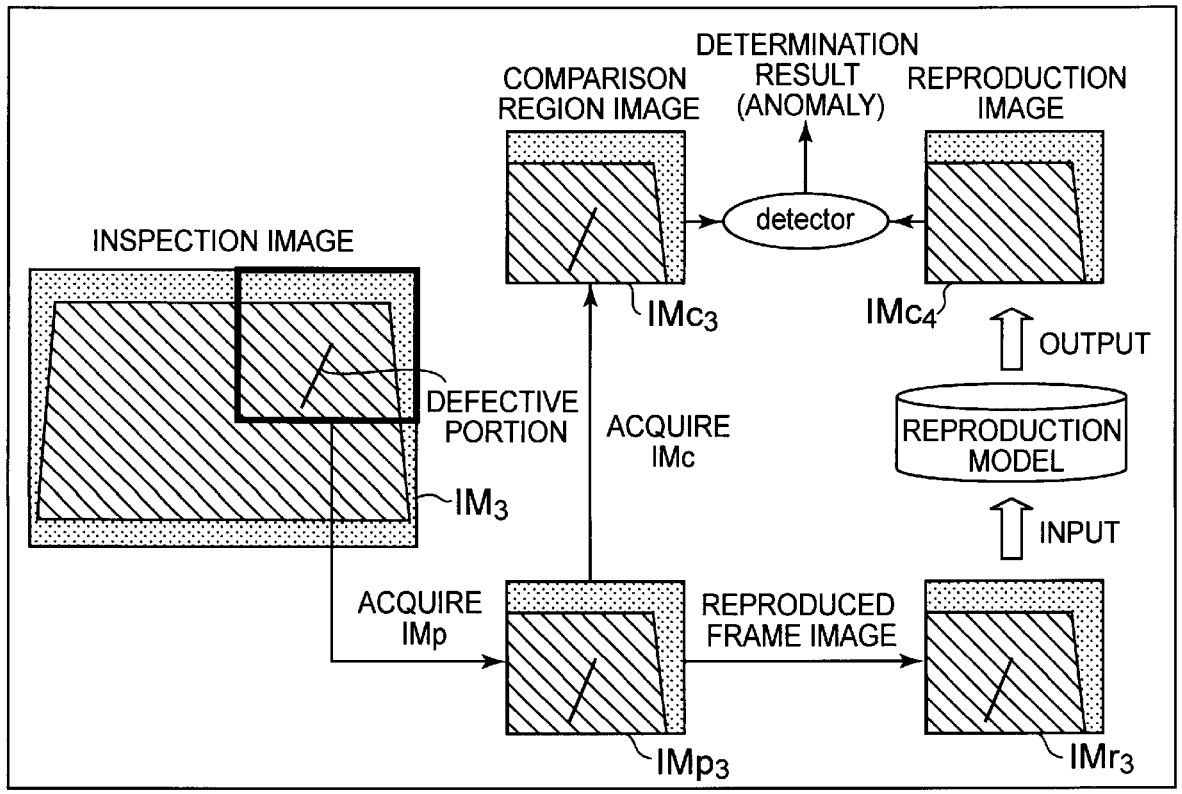

IMAGE PROCESSING DEVICE, IMAGE PROCESSING METHOD, AND IMAGE PROCESSING PROGRAM

This application is a National Stage Entry of PCT/JP2019/008581 filed on Mar. 5, 2019, which claims priority from Japanese Patent Application 2018-064097 filed on Mar. 29, 2018, the contents of all of which are incorporated herein by reference, in their entirety.

TECHNICAL FIELD

The present invention relates to an image processing device, an image processing method, and an image processing program for determining non-defect/defect of an object for inspection.

BACKGROUND ART

As accuracy of image recognition using machine learning such as deep learning is improved, there is an increasing need for automation of classification work for checking whether or not a target object is in a normal condition in inspection/production checking. However, since the number of target objects that are not in a normal condition, such as defective products, is much smaller than the number of target objects that are in a normal condition, there is a problem that it is difficult to collect training data used for learning.

PTL 1 describes a method for enhancing efficiency of learning work and improving recognition accuracy by artificially editing an image of a defective product sample from a sample image at the time of model learning.

In addition, PTL 2 describes the following method as a method for enhancing learning accuracy even in a case where only a few images of defects generated in a defective product are available in an inspection device. In the method described in PTL 2, first, non-defect/defect determination information indicating whether a plurality of pseudo-defect images representing images of defects generated on a surface of an object for inspection in a pseudo manner corresponds to a non-defective product or a defective product is acquired. Then, a discrimination boundary between a non-defective product and a defective product is determined, and a discriminator is learned using a plurality of learning samples which are a set of a feature amount of a defect image and a non-defect/defect determination result for the feature amount determined according to the discrimination boundary.

In addition, PTL 3 describes the following method as a method for improving non-defect/defect determination accuracy of an inspection target even in a case where the number of sample images is small. In the method described in PTL 3, a learning image is divided into a plurality of divided images, machine learning is performed on each of the plurality of divided images of the learning image obtained by division, and a feature amount is extracted. Note that in the method described in PTL 3, prior to the extraction of the feature amount, each of the divided images is classified into a finer class than non-defect/defect according to the quality of an object contained in the divided image. When determination is performed, each of the divided images is classified into the above class on the basis of a feature amount extracted from the divided image of each inspection image by machine learning, and then non-defect/defect of an inspection target is determined on the basis of the classification result.

CITATION LIST

Patent Literature

PTL 1: Japanese Patent Application Laid-Open No. Hei 05-149728
PTL 2: Japanese Patent Application Laid-Open No. 2011-214903
PTL 3: Japanese Patent Application Laid-Open No. 2017-211259

SUMMARY OF INVENTION

Technical Problem

By using the technique described in PTL 1, it is possible to generate many defective product sample images in a pseudo manner. However, in the method described in PTL 1, learning is performed by using a non-defective product sample image and a defective product sample image separately. That is, a predetermined feature amount is independently extracted from each image, and a coefficient determined to be normal (normal coefficient) and a coefficient determined to be anomaly (anomaly coefficient) are learned. However, such a method for learning a non-defective product sample and a defective product sample separately as independent ones without particularly associating the non-defective product sample and the defective product sample with each other has a problem that determination accuracy is deteriorated due to an influence by an individual difference of an image or an object that is a subject of the image (for example, a difference in the size or color tone of an object in an image, a difference in the size or color tone of a defective portion in an image, or a difference in color tone, size, or details of a subject itself) in a case where the influence is large.

In addition, in the method described in PTL 2, it is necessary to input a feature amount and a determination result according to a discrimination boundary for the feature amount to a learning model, and it is necessary to extract the feature amount and to determine a non-defect/defect boundary for the extracted feature amount before learning. Thus, the method is troublesome. In addition, also in the method described in PTL 2, since a process of extracting a feature amount is performed independently for each image, if an extracted feature amount is influenced by an individual difference of an image or a subject thereof, a learning result is also influenced by the individual difference, of course, and a similar problem to the method described in PTL 1 occurs.

In addition, also in the method described in PTL 3, it is necessary to classify each classified image of a learning image into a plurality of classes according to the quality of the classified image before learning. Thus, the method is troublesome. In addition, also in the method described in PTL 3, a similar problem to the method described in PTL 1 occurs because a process of extracting a feature amount is performed independently for each divided image.

The present invention has been achieved in view of the above problems. An object of the present invention is to provide an image processing device, an image processing method, and an image processing program that can determine non-defect/defect of an object for inspection without trouble and with high accuracy even in a case where it is difficult to collect an image of an object not in a normal condition for learning.

Solution to Problem

An image processing device according to the present invention is characterized by including: a normal image acquisition means which acquires a normal image including an object for inspection in a normal condition; an anomaly simulated image generation means which inserts, into the normal image, a simulated image of an anomaly feature of the object for inspection in an anomaly condition to generate an anomaly simulated image; and a model learning means which, using the normal image and the anomaly simulated image, learns a reproduction model for generating, from part of an image containing the object for inspection, a reproduction image is an image including at least a predetermined region of the object for inspection in which the predetermined region in a normal condition is reproduced.

In addition, an image processing method according to the present invention is characterized in that an information processing device acquires a normal image including an object for inspection in a normal condition, inserts, into the normal image, a simulated image of an anomaly feature of the object for inspection in an anomaly condition to generate an anomaly simulated image, and learns, using the normal image and the anomaly simulated image, a reproduction model for generating, from part of an image containing the object for inspection, a reproduction image is an image including at least a predetermined region of the object for inspection in which the predetermined region in a normal condition is reproduced.

In addition, an image processing program according to the present invention is characterized by causing a computer to execute: a process of acquiring a normal image including an object for inspection in a normal condition; a process of inserting, into the normal image, a simulated image of an anomaly feature of the object for inspection in an anomaly condition to generate an anomaly simulated image; and a process of learning, using the normal image and the anomaly simulated image, a reproduction model for generating, from part of an image containing the object for inspection, a reproduction image is an image including at least a predetermined region of the object for inspection in which the predetermined region in a normal condition is reproduced.

Advantageous Effects of Invention

According to the present invention, non-defect/defect of an object for inspection can be determined without trouble and with high accuracy even in a case where it is difficult to collect an image of an object not in a normal condition for learning.

BRIEF DESCRIPTION OF DRAWINGS

FIG. 3 is an explanatory diagram showing another example of the image pair generating process.

FIG. 4 is an explanatory diagram showing an outline of a model learning process.

FIG. 5 is an explanatory diagram showing an outline of an anomaly detecting process.

FIG. 6 is a flowchart showing an example of operation of the image processing device according to the first exemplary embodiment.

FIG. 7 is a flowchart showing an example of operation of the image processing device according to the first exemplary embodiment.

FIG. 10 is an explanatory diagram showing another example of the model learning process.

FIG. 11 is an explanatory diagram showing another example of the anomaly detecting process.

FIG. 13 is an explanatory diagram showing another example of the anomaly detecting process.

DESCRIPTION OF EMBODIMENTS

First Exemplary Embodiment

Figure 1:
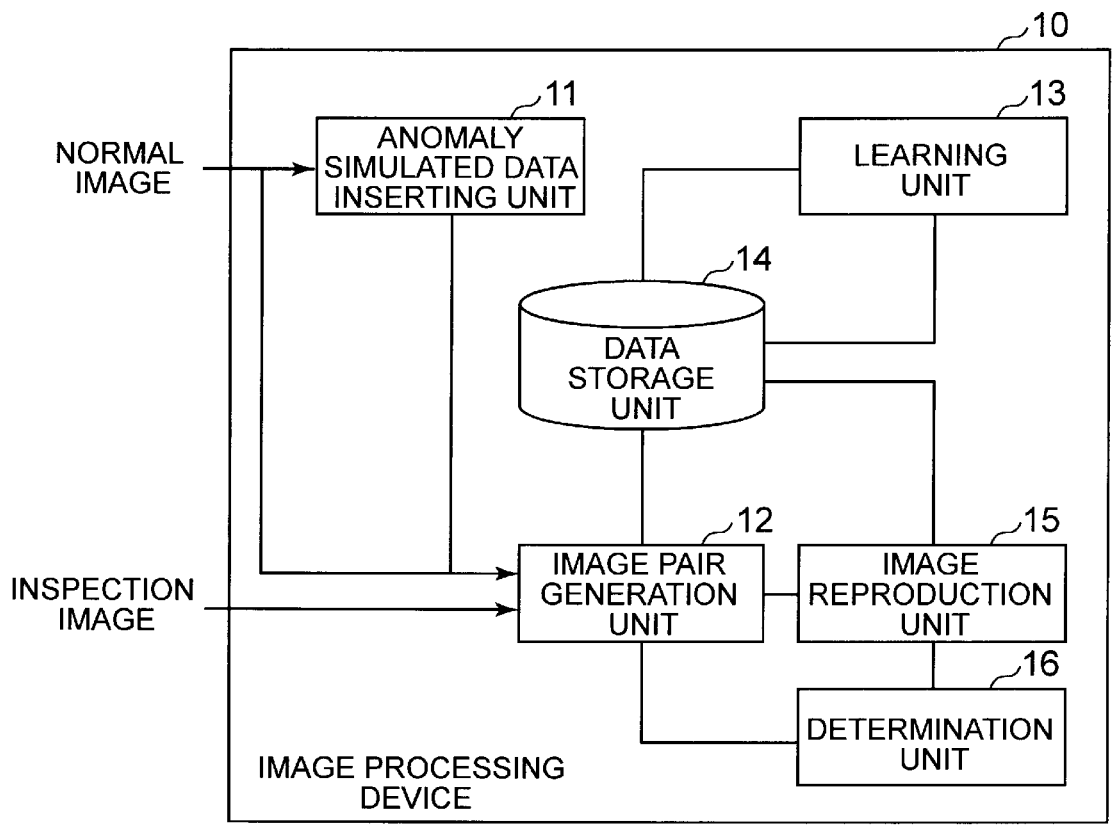
FIG. 1 is a block diagram showing a configuration example of an image processing device according to a first exemplary embodiment.

Hereinafter, exemplary embodiments of the present invention will be described with reference to the drawings. FIG. 1 is a block diagram showing a configuration example of an image processing device according to a first exemplary embodiment. An image processing device 10 shown in FIG. 1 includes an anomaly simulated data inserting unit 11, an image pair generation unit 12, a learning unit 13, a data storage unit 14, an image reproduction unit 15, and a determination unit 16.

When one or more normal images are input as a learning image to the anomaly simulated data inserting unit 11, that is, when an image containing an object for inspection in a normal condition is input to the anomaly simulated data inserting unit 11, the anomaly simulated data inserting unit 11 inserts (synthesizes) anomaly simulated data that is an image simulating assumed features of the object for inspection in an anomaly condition into each of the normal images. Hereinafter, an image into which the anomaly simulated data is inserted may be referred to as an anomaly simulated image.

Examples of the anomaly simulated data include the following.
Scratch
Chip
Noise
Stain For example, the anomaly simulated data inserting unit 11 may insert a linear scratch into a normal image. Examples of a method for inserting a scratch include the following. Note that the number of scratches is not limited to one, and the shape of the scratch is not limited to a linear shape.

[Method for Inserting Scratch]
(1) Determining a color (for example, using the color of a part of an image or a predetermined color)
(2) Determining an end point of a line (for example, determining the positions of end points (two points) randomly on an image)
(3) Inserting a straight line (adding a straight line between determined endpoints using a determined color)

In addition, for example, the anomaly simulated data inserting unit 11 may insert a chip on a surface into a normal image. Examples of a method for inserting a scratch include the following. Note that the number of chips is not limited to one, and the shape of the chip is not limited to a polygon.

[Method for Inserting Chip]
(1) Determining a color (for example, using the color of a part of an image or a predetermined color)
(2) Determining the type of a chip (for example, randomly determining the type of a chip from among predetermined polygons)
(3) Determining a vertex of a chip (randomly determining the positions of vertices of a polygon on an image)
(4) Inserting a chip (adding a polygon connecting determined vertices using a determined color)

In addition, for example, the anomaly simulated data inserting unit 11 may insert a noise into a normal image. Examples of inserting a noise include inserting a white noise into an entire image or a part of the image.

In addition, for example, the anomaly simulated data inserting unit 11 may insert a stain on a surface into a normal image. Examples of a method for inserting a stain include the following. Note that the number of stains is not limited to one, and the shape of the stain is not limited to a circle and a polygon.

[Method for Inserting Stain]
(1) Determining a color (for example, using the color of a part of an image or a predetermined color)
(2) Determining the shape and area of a stain (for example, assuming that the shape is a circle or a polygon, and determining a range of the shape. In addition, a shading distribution may be added on the basis of a normal distribution or the like)
(3) Inserting a stain (adding a stain having a determined shape using a determined color)

The image pair generation unit 12 acquires a partial image (hereinafter, referred to as a patch image) containing a predetermined region (inspection target region) to be compared with an inspection image in a subsequent inspection step for each normal image and each anomaly simulated image obtained by inserting anomaly simulated data from these normal images, and generates, from the patch image, an image pair including a comparison region image containing at least the predetermined region and a reproducing image to be input to a reproduction model for reproducing a comparison region image in a normal condition, the reproducing image containing the predetermined region or at least a part of a region in contact with the predetermined region. Hereinafter, a process of generating such an image pair is referred to as an image pair generating process. In addition, hereinafter, a region contained in a comparison region image may be referred to as a "comparison region".

Figure 2:
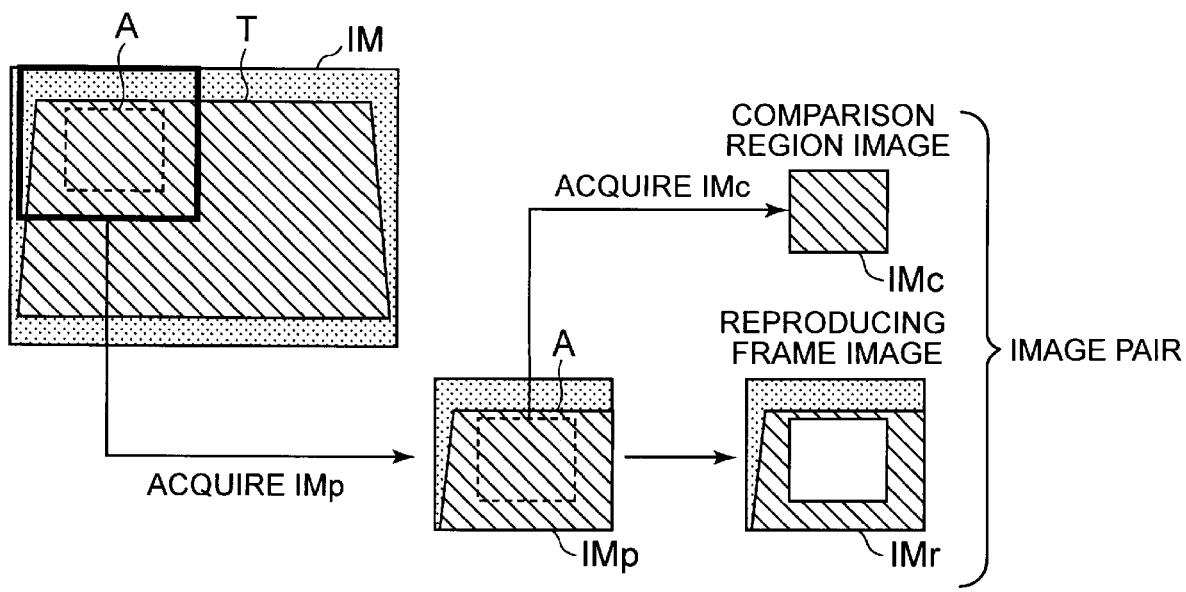
FIG. 2 is an explanatory diagram showing an outline of an image pair generating process.

FIG. 2 is an explanatory diagram showing an outline of the image pair generating process. In FIG. 2, T represents an object for inspection, IM represents an original image, A represents an inspection target region, IMp represents an acquired patch image, IMc represents a comparison region image, and IMr represents a reproducing image. Note that, in FIG. 2, the shape of each of the patch image and the comparison region image is a quadrangle. However, the shape of each of the patch image and the comparison region image is not limited to a quadrangle, and the type of the shape does not matter as long as one or more image pairs of a comparison region image and a reproducing image can be acquired for an original image, such as a circle or a triangle. Note that the patch image and the comparison region image may have different shapes from each other.

In addition, FIG. 2 shows an example in which a comparison region image is cut out from the center of a patch image. However, it is only required to acquire an image in a predetermined region to be compared from a patch image having a predetermined size, and copying may be performed in addition to cutting out. In this case, an image in a comparison region is left as it is in the reproducing image (that is, the reproducing image includes the comparison region). In addition, the position of the predetermined region to be compared is not limited to the center of the patch image, and the size of the predetermined region is not necessarily smaller than that of the patch image. For example, the patch image and the comparison region image may have the same size.

FIG. 3 is an explanatory diagram showing another example of the image pair generating process. In the upper of FIG. 3, an image obtained by copying a partial region (comparison region) of a patch image (IMp) is used as a comparison region image (IMc), and an original patch image (IMp) is used as a reproducing image (IMr). At this time, as shown in the upper of FIG. 3, it is also possible to add information indicating a reproduction region (comparison region) to the reproducing image. In addition, in the lower of FIG. 3, an image obtained by copying a patch image (IMp) is used as a comparison region image (IMc), and an original patch image (IMp) is used as a reproducing image (IMr). At this time, as shown in the lower of FIG. 3, an image in an inspection target region may be acquired as a patch image.

In addition, a patch size is not particularly limited. For example, the patch size may be the same as the size of an original image or may be smaller than the size of the original image. In a case where the patch size is the same as the size of the original image, the image pair generating process only needs to be performed once on one original image. In a case where the patch size is smaller than the size of the original image, the image pair generating process can be performed a plurality of times on one original image.

For example, the image pair generation unit 12 may perform the image pair generating process on one original image while moving a designated slide size until a patch image cannot be acquired with a predetermined patch size. At this time, the slide size may be equal to or smaller than the size (width in a slide direction) of the patch image. In this case, the patch images acquired from the original image may overlap each other. For example, the image pair generation unit 12 only needs to acquire a patch image and generate an image pair such that a finally obtained comparison region image covers all the inspection target regions (for example, a region in which an object for inspection T appears (target object region) in the original image). Note that the patch size, the slide size, and the size and position of the comparison region image can be appropriately set according to, for example, accuracy required for inspection.

The image pair generation unit 12 performs such an image pair generating process on each of normal images and also on each of anomaly simulated images obtained by inserting anomaly simulated data from these normal images. At that time, the image pair generation unit 12 obtains a patch image and a comparison region image having the same size from the same position with a normal image and an anomaly simulated image obtained from the normal image. Hereinafter, a combination of a patch image in a certain region acquired from a normal image and a patch image in the same region as the above acquired from an anomaly simulated image obtained by inserting anomaly simulated data into the normal image may be referred to as a "patch image set". In addition, in the following, in such a patch image set, a patch image obtained from a normal image may be referred to as a first patch image ($IMp_1$), and a patch image obtained from an anomaly simulated image may be referred to as a second patch image ($IMp_2$). Furthermore, an image pair (IMc, IMr) obtained from the first patch image ($IMp_1$) may be referred to as a first image pair ($IMc_1$, $IMr_1$), and an image pair (IMc, IMr) obtained from the second patch image ($IMp_2$) may be referred to as a second image pair ($IMc_2$, $IMr_2$). Note that the number of second patch images associated with a first patch image in a certain patch image set is not limited to one, and is equal to the number of anomaly simulated images generated from one normal image.

In the present exemplary embodiment, for a normal image to be a learning image and each patch image set obtained from an anomaly simulated image corresponding to the normal image, a first image pair ($IMc_1$, $IMr_1$) and a second image pair ($IMc_2$, $IMr_2$) are generated.

In addition, when an inspection image is input to the image pair generation unit 12, the image pair generation unit 12 performs a similar image pair generating process on the inspection image, and generates an image pair (IMc, IMr) for each patch image of the inspection image.

The learning unit 13 learns a reproduction model that reproduces a comparison region image in a normal condition from an arbitrary reproducing image on the basis of an image pair generated from a normal image that is a learning image and an anomaly simulated image corresponding to the normal image. More specifically, the learning unit 13 performs model learning such that correct answer data can be reproduction from input data using, as input data, reproducing images of a normal image and an anomaly simulated image ($IMr_1$ and $IMr_2$) contained in each patch image set, and using, as teacher data (correct answer output data), only a comparison region image $IMc_1$ of a first patch image in the patch image set. As such a model learning method, the learning unit 13 only needs to use a method capable of reproducing an input, such as an automatic encoder in deep learning.

FIG. 4 is an explanatory diagram showing an outline of a model learning process. For example, when learning a reproduction image for a reproducing image $IMr_1$ of a patch image of a normal image (first patch image $IMp_1$), the learning unit 13 uses, as teacher data, a comparison region image $IMc_1$ of the first patch image $IMp_1$ as it is (see the upper of FIG. 4). Meanwhile, when learning a reproduction image for a reproducing image $IMr_2$ acquired from a second patch image $IMp_2$ which is a patch image of an anomaly simulated image, the learning unit 13 uses, as teacher data, a comparison region image $IMc_1$ of the first patch image $IMp_1$ forming a patch image set with the second patch image $IMp_2$ (see the lower of FIG. 4).

At this time, the learning unit 13 only needs to perform model learning using an image pair contained in the patch image set as training data after changing a comparison region image of the second patch image contained in the patch image set to a comparison region image of the first patch image. Note that a learning method in the learning unit 13 is not limited to this method. The learning unit 13 only needs to learn a reproduction model using at least a normal image and an anomaly simulated image. For example, as described above, when learning an anomaly simulated image, the learning unit 13 may perform learning using a set with an original image (normal image) before insertion of anomaly simulated data. At this time, the learning unit 13 may use a set of patch images acquired from the same coordinates as each other. For example, when a reproducing image in an image pair generated from an anomaly simulated image is used as input data, a comparison region image in an image pair of a normal image forming a patch image set with the image pair may be used as teacher data (reproduction image).

Using a reproducing image acquired from each patch image acquired from an inspection image as an input, and using a reproduction model learned by the learning unit 13, the image reproduction unit 15 generates a reproduction image that is a comparison region image corresponding to the reproducing image and reproduces the comparison region image in a normal condition.

The determination unit 16 compares a reproduction image generated by the image reproduction unit 15 with a comparison region image (determination target image) forming an image pair with a reproducing image of an inspection image used for the reproduction, and determines whether or not the determination target image is an image of a target object in a normal condition. For example, by computing a difference between the reproduction image and the determination target image, the determination unit 16 only needs to determine whether the determination target image is normal or anomaly on the basis of the magnitude of the computed difference. A method for computing the difference is not particularly limited, but the following can be used, for example.

[Method for Computing Difference]
Difference in pixel value
Area where regions having a difference in pixel value are continuous
Total area of regions having a difference in pixel value
Sum of difference in pixel value
Average of difference in pixel value For example, the determination unit 16 can compute, as a difference between a determination target image (first image) and a reproduction image (second image), an absolute value of a difference in pixel value between pixels at specific positions or pixels contained in a specific region in the first image and the second image. In addition, as the difference, it is also possible to compute an area where regions having a difference in pixel value between the first image and the second image are continuous. In addition, as the difference, it is also possible to compute a sum of a difference in pixel value for each pixel between the first image and the second image. In addition, as the difference, it is also possible to compute an average of a difference in pixel value for each pixel between the first image and the second image. In addition, as the difference, a sum of squared difference (SSD) and a sum of absolute difference (SAD) can be computed.

Note that when a difference between different types of images is computed, for example, two images of an RGB image and another color image can be used as they are for computation of the difference, and furthermore, after the images are converted into other types of images or images in other color spaces, or filtered, the resulting images can be used for computation of the difference. For example, after the images are converted into other types of images such as a grayscale image and a binarized image, or converted into images in other color spaces such as HSV and YCbCr, the resulting images can be used for computation of the difference. In addition, for example, after the images are filtered using a pre-processing filter such as an averaging filter or a median filter, or an edge extraction filter such as a Sobel filter or a Laplacian filter, the resulting images can be used for computation of the difference.

In addition, examples of a method for determining the magnitude of the difference include a method for setting a threshold value in advance and determining that the difference obtained by the above method is anomaly in a case where the difference exceeds the threshold value and determining that the difference is normal otherwise. In addition, for example, a normal image for verification is prepared, a difference between a comparison region image acquired from the normal image and a reproduction image is computed, and a threshold value can be automatically set such that all the obtained differences are determined to be normal.

FIG. 5 is an explanatory diagram showing an outline of an anomaly detecting process. The upper of FIG. 5 is an explanatory diagram showing an outline of an anomaly detecting process in a case where an image of a normal product is input as an inspection image, and the lower of FIG. 5 is an explanatory diagram showing an outline of the anomaly detecting process in a case where an image of an anomaly product is input as an inspection image. In FIG. 5, $IM_3$ represents an inspection image, $IMp_3$ represents a patch image acquired from the inspection image, $IMc_3$ and $IMr_3$ are a comparison region image and a reproducing image acquired from the patch image of the inspection image, and $IMc_4$ represents a reproduction image (comparison region image in a normal condition) reproduction from the reproducing image of the patch image of the inspection image.

In the upper of FIG. 5, as a result of comparing a comparison region image ($IMc_3$) from a patch image obtained from an inspection image with a reproduction image ($IMc_4$) that is a comparison region image in a normal condition reproduction using a reproduction model based on a reproducing image of the patch image, the features of both images match. Therefore, the comparison region image ($IMc_3$) is determined to be normal. Meanwhile, in the lower of FIG. 5, as a result of comparing a comparison region image ($IMc_3$) from a patch image obtained from an inspection image with a reproduction image ($IMc_4$) that is a comparison region image in a normal condition reproduction using a reproduction model based on a reproducing image of the patch image, the features of both images do not match. Therefore, the comparison region image ($IMc_3$) is determined to be anomaly.

Next, operation of an image processing device according to the present exemplary embodiment will be described. Operation of the image processing device 10 according to the present exemplary embodiment is roughly classified into a model learning phase for learning a reproduction model and an inspection phase for determining an inspection image using the learned reproduction model.

In the model learning phase, learning is performed using an image in a normal condition as teacher data, and a reproduction model reproducing an image in a predetermined region (comparison region image) in a normal condition from a reproducing image that is a part of an image in a normal condition and an image simulating anomaly. More specifically, as training data, not only data associating a reproducing image acquired from a normal image with a comparison region image corresponding to the reproducing image but also data associating a reproducing image acquired from an anomaly simulated image obtained by inserting anomaly simulated data into a normal image with a comparison region image in a normal condition before the insertion of the anomaly simulated data is used such that the comparison region image is reproduction also for the reproducing image.

In addition, in the inspection phase, a comparison region image in a normal condition is reproduction for comparison from a reproducing image acquired from an image to be inspected using a reproduction model generated in the model learning phase, and it is determined whether the comparison region image is normal or anomaly from a difference from an actual comparison region image.

FIG. 6 is a flowchart showing an example of operation of the image processing device 10 according to the present exemplary embodiment in the model learning phase. In the example shown in FIG. 6, the anomaly simulated data inserting unit 11 first acquires one or more normal images as learning data (step S101). The normal images acquired here are stored in the data storage unit 14, for example, as learning images.

Subsequently, the anomaly simulated data inserting unit 11 inserts anomaly simulated data indicating an assumed tendency of anomaly into each of the acquired normal images, and generates anomaly simulated images (step S102). The anomaly simulated images generated here are stored in the data storage unit 14, for example, as learning images.

Subsequently, the image pair generation unit 12 performs an image pair generating process on each of the normal images and each of the anomaly simulated images stored as learning images (step S103). The image pair generation unit 12 extracts, for example, a region having a predetermined size as a patch image for each of the normal images and each of the anomaly simulated images generated from the normal images. At this time, the image pair generation unit 12 extracts the same region from a normal image and an anomaly simulated image corresponding to the normal image, and sets the extracted images as a patch image set. Then, the image pair generation unit 12 acquires an image having a designated size from each of the extracted patch image sets, and generates an image pair of a comparison region image and a reproducing image. In this example, two types of image pairs (($IMc_1$, $IMr_1$) and ($IMc_2$, $IMr_2$)) generated from one patch image set are held in the data storage unit 14 in association with each other. The image pair generation unit 12 may repeat such an image pair generating process while moving by a predetermined slide size until the image pair generation unit 12 completes scanning for all regions of a normal image that is an original image and an anomaly simulated image. As a result, two types of image pairs corresponding to each of one or more patch image sets are obtained from one set of images (normal image and anomaly simulated image). The two types of image pairs obtained here are stored in, for example, the data storage unit 14.

Subsequently, the learning unit 13 generates training data on the basis of the two types of image pairs corresponding to each of one or more patch image sets for each set of a normal image and an anomaly simulated image, the two types of image pairs being obtained by the image pair generating process (step S104). Here, the learning unit 13 changes a comparison region image contained in an image pair obtained from an anomaly simulated image out of the two types of image pairs obtained from each patch image set to a comparison region image contained in an image pair obtained from a corresponding normal image, and then generates training data using a comparison region image of each image pair as teacher data and using a corresponding reproducing image as input data.

Thereafter, the learning unit 13 learns a reproduction model reproducing a comparison region image of a normal image from a reproducing image using the training data generated in step S104 (step S105).

Finally, the learning unit 13 stores the reproduction model after learning (step S106).

In addition, FIG. 7 is a flowchart showing an example of operation of the image processing device 10 according to the present exemplary embodiment in the inspection phase. In the example shown in FIG. 7, the image pair generation unit 12 first acquires an inspection image as inspection target data (step S201).

Subsequently, the image pair generation unit 12 performs an image pair generating process on the inspection image acquired in step S201 (step S202). An image pair only needs to be generated by a method similar to a method performed on a learning image in the learning phase. As a result, an image pair of a comparison region image and a reproducing image is obtained from an inspection image for each of one or more patch images. The image pair obtained here is stored in, for example, the data storage unit 14.

Subsequently, the image reproduction unit 15 reproduces, from a reproducing image obtained from each patch image, a comparison region image in a normal condition corresponding to the reproducing image using a reproduction model learned in the learning phase (step S203).

Finally, the determination unit 16 compares the comparison region image in a normal condition (reproduction image) reproduction in step S203 with the comparison region image acquired from an original image (inspection image) in step S202, and determines whether the inspection target region of the original image is normal or anomaly on the basis of a difference between the comparison region images (step S204).

As described above, according to the present exemplary embodiment, even in a situation where an anomaly image cannot be obtained, it is possible to generate a reproduction model with high reproducibility of a comparison region image in a normal condition with respect to a reproducing image acquired from an original image (inspection image) in which an object for inspection appears only from a normal image. Therefore, even in a case where an inspection image in which an individual difference is easily generated is input, it is possible to increase accuracy of detecting a defective portion.

In the present exemplary embodiment, as a method for detecting a defective portion in an inspection image, using a pre-learned reproduction model for each of one or more comparison region images to be determined, the comparison region images being acquired from the inspection image, a comparison region image in a normal condition corresponding to a reproducing image used for acquiring the comparison region image is reproduction and used as a comparison target. By using such a method for comparing a comparison region image obtained from an inspection image with a reproduction image in a normal condition reproduction from a reproducing image of the comparison region image and determining whether the comparison region image is in a normal condition or in an anomaly condition, determination with a reduced individual difference of an image is possible.

However, in this method, how to accurately reproduce a comparison region image in a normal condition is important. In a case where, in the model learning phase, a reproduction model is learned using, as training data, only an image pair obtained by acquiring a patch image from only a normal image as shown in the upper of FIG. 4, when a region where features of anomaly appear is large in an inspection image, accuracy of detecting the anomaly may be low. For example, in a case where an inspection image acquired in the inspection phase includes defective portions extending over a reproducing image of a patch image, a learned reproduction model complements the defective portions appearing in the reproducing image, and even the defective portions may be reproduction in a reproduction image. In this case, a difference from a comparison region image obtained from an original image (inspection image) is small. Therefore, determination for an anomaly condition cannot be performed, and accuracy of detecting a defective product may be low.

However, in the method according to the present exemplary embodiment, as shown in FIG. 4, by adding, to training data, not only an image pair obtained from a normal image but also an image pair of a reproducing image obtained from an anomaly simulated image in which anomaly simulated data is inserted into the normal image and a comparison region image (in a normal condition) obtained from the normal image before the insertion, reproducibility in a normal condition in a reproduction model can be increased. As a result, it is possible to reproduce an image in which a difference from a comparison region image obtained from an inspection image having features in an anomaly condition is large. Therefore, accuracy of determining an anomaly condition can be further increased.

Second Exemplary Embodiment

Figure 8:
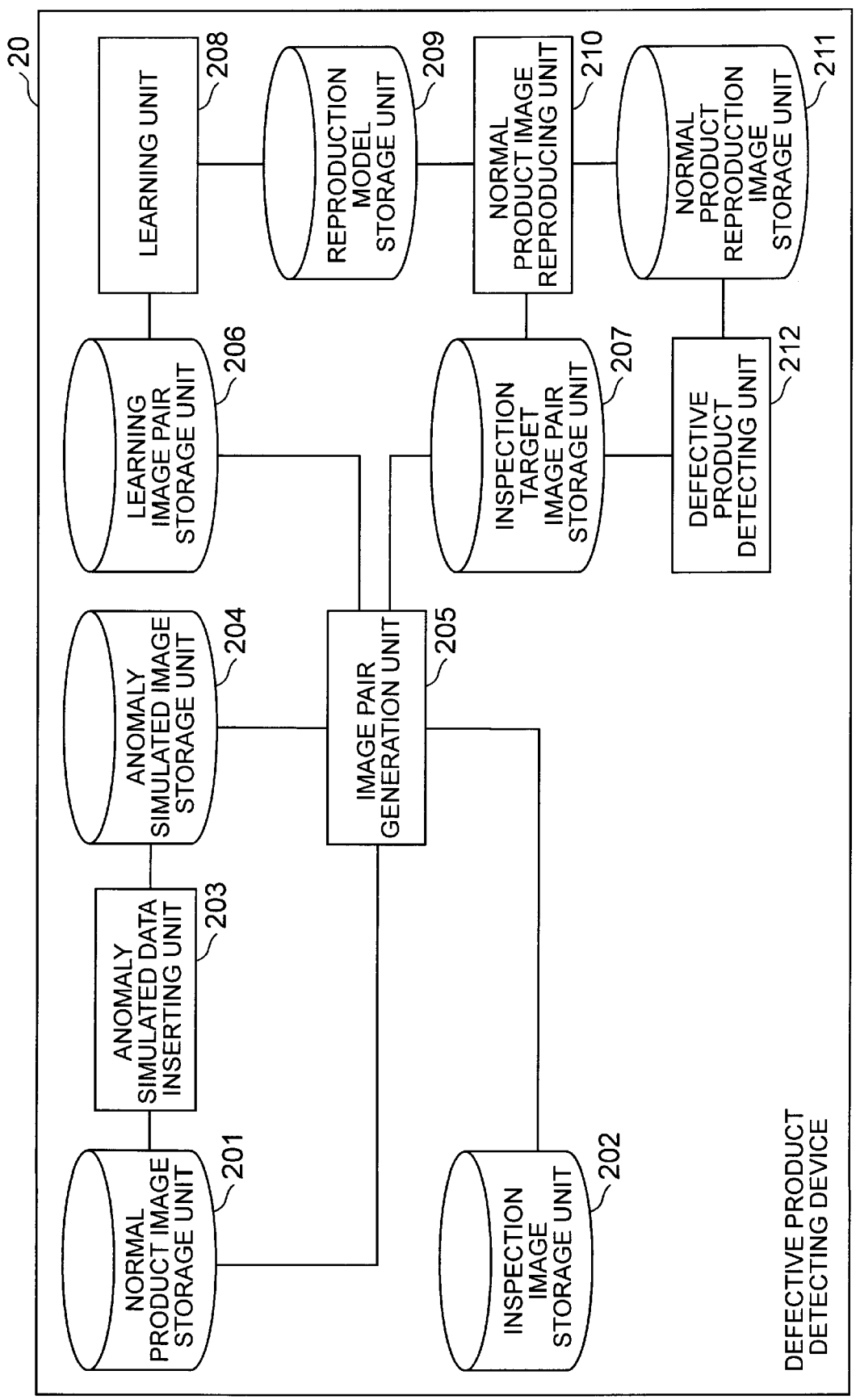
FIG. 8 is a block diagram showing a configuration example of a defective product detecting device according to a second exemplary embodiment.

Next, a second exemplary embodiment will be described. FIG. 8 is a block diagram showing a configuration example of a defective product detecting device according to the second exemplary embodiment. A defective product detecting device 20 shown in FIG. 8 includes a normal product image storage unit 201, an inspection image storage unit 202, an anomaly simulated data inserting unit 203, an anomaly simulated image storage unit 204, an image pair generation unit 205, a learning image pair storage unit 206, an inspection target image pair storage unit 207, a learning unit 208, a reproduction model storage unit 209, a normal product image reproducing unit 210, a normal product reproduction image storage unit 211, and a defective product detecting unit 212.

Note that in the example shown in FIG. 8, the anomaly simulated data inserting unit 203 corresponds to the anomaly simulated data inserting unit 11 described above, the image pair generation unit 205 corresponds to the image pair generation unit 12, the learning unit 208 corresponds to the learning unit 13, the normal product image reproducing unit 210 corresponds to the image reproduction unit 15, and the defective product detecting unit 212 corresponds to the determination unit 16.

The normal product image storage unit 201 holds a normal product image that is an image of a normal product used for learning.

The inspection image storage unit 202 holds an inspection image that is an image used for inspection.

The anomaly simulated data inserting unit 203 reads a normal product image held in the normal product image storage unit 201, inserts data simulating assumed features of anomaly into the image, and stores the image in the anomaly simulated image storage unit 204.

The anomaly simulated image storage unit 204 holds the anomaly simulated image that is a normal product image into which anomaly simulated data is inserted, the anomaly simulated image being generated by the anomaly simulated data inserting unit 203.

The image pair generation unit 205 reads images from the normal product image storage unit 201 and the anomaly simulated image storage unit 204, performs an image pair generating process, and stores an image pair (for example, a comparison region image containing only a central portion and a reproducing image containing at least the central portion or a frame portion of the central portion) as an output of the image pair generating process in the learning image pair storage unit 206.

In addition, the image pair generation unit 205 reads an image from the inspection image storage unit 202, similarly performs the image pair generating process, and stores an image pair as an output of the image pair generating process in the inspection target image pair storage unit 207.

The learning image pair storage unit 206 holds an image pair generated by the image pair generation unit 205 from a normal product image and an anomaly simulated image as a learning image pair in association with each other.

The inspection target image pair storage unit 207 holds an image pair generated by the image pair generation unit 205 from an inspection image as an inspection image pair.

The learning unit 208 reads a learning image pair from the learning image pair storage unit 206 and learns a reproduction model. At this time, for an image pair generated from an anomaly simulated image, the learning unit 208 changes a comparison region image of the image pair to a comparison region image of a corresponding normal product image, and then performs model learning.

The reproduction model storage unit 209 holds a reproduction model generated by the learning unit 208.

The normal product image reproducing unit 210 reads a learned reproduction model from the reproduction model storage unit 209, reads an inspection image pair from the inspection target image pair storage unit 207, and reproduce a comparison region image of a normal product corresponding to a reproducing image of the inspection image pair.

The normal product reproduction image storage unit 211 holds a normal product reproduction image that is a comparison region image of a normal product corresponding to a reproducing image of an inspection image pair generated by the normal product image reproducing unit 210.

The defective product detecting unit 212 reads out a comparison region image of an inspection image pair from the inspection target image pair storage unit 207, also reads out a corresponding normal product reproduction image (that is, a normal product reproduction image reproduction from a reproducing image of the comparison region image) from the normal product reproduction image storage unit 211, and determines whether the comparison region image is an image of a normal product or an image of a defective product.

Next, operation of the present exemplary embodiment will be described. The operation of the present exemplary embodiment is basically similar to that of the first exemplary embodiment. Hereinafter, the operation of the present exemplary embodiment will be briefly described with reference to FIGS. 6 and 7 again.

First, operation in a model learning phase in the present exemplary embodiment will be described with reference to FIG. 6.

In the defective product detecting device 20 according to the present exemplary embodiment, first, in step S101, the anomaly simulated data inserting unit 203 reads a normal product image to be learned from the normal product image storage unit 201.

In step S102, the anomaly simulated data inserting unit 203 inserts data indicating an assumed tendency of anomaly into the read image and stores the image in the anomaly simulated image storage unit 204. For example, as shown in the lower of FIG. 4, the anomaly simulated data inserting unit 203 adds anomaly simulated data (a scratch in the example of FIG. 4) to an original normal product image.

In step S103, the image pair generation unit 205 performs an image pair generating process on a normal product image for learning and an anomaly simulated image generated in step S102. For example, as shown in FIG. 2, the image pair generation unit 205 extracts an image of a region having a designated size (patch size) in the original image IM as a patch image. When a patch image is extracted from an anomaly simulated image, the same region as a corresponding normal product image is extracted as a patch image IMp. Then, an image having a designated size may be removed from the central portion of the extracted patch image IMp. Hereinafter, an image obtained by removing the central portion of a patch image having a patch size (IMr in the figure) may be referred to as a central portion-removed patch image, and an image acquired from the central portion of the patch image (IMc in the figure) may be referred to as a central portion image. Note that the central portion-removed patch image corresponds to the above reproducing image, and the central portion image corresponds to the above comparison region image. Finally, a pair of the obtained central portion-removed patch image and central portion image is stored in the learning image pair storage unit 206. At this time, an image pair obtained from an anomaly simulated image and an image pair obtained from a normal product image that is an original image of the anomaly simulated image are stored in association with each other.

In step S103, thereafter, the image pair generation unit 205 similarly acquires a patch image and removes a central portion at a portion to which the image pair generation unit 205 has moved by a designated slide size. This operation is repeated until a patch image cannot be acquired for an original image. Note that as described above, the slide size may be equal to or smaller than a patch size, or patch images to be extracted may overlap each other. Note that, in the example of FIG. 2, the central portion of the patch image is extracted and used as a central portion image. However, the acquisition position is not limited to the central portion, and the shape is not limited to a quadrangle as long as an image having a designated size can be obtained from an image having a patch size.

In steps S104 to S105, the learning unit 208 reads a learning image pair generated in step S103 and learns a reproduction model using a central portion-removed patch image as input data and using a central part image as teacher data (correct answer output data) such that the central portion image can be reproduction from the central portion-removed patch image. At this time, when learning a learning image pair obtained from an anomaly simulated image, the learning unit 208 performs learning using, as teacher data, not a central portion image of the image pair but a central portion image acquired from the same position of a corresponding normal image.

In step S106, the learning unit 208 stores a reproduction model learned in step S105 in the reproduction model storage unit 209.

Next, operation in an inspection phase in the present exemplary embodiment will be described with reference to FIG. 7. In the defective product detecting device 20 according to the present exemplary embodiment, first, in step S201, the image pair generation unit 205 reads an inspection image that is an image to be inspected from the inspection image storage unit 202.

In step S202, the image pair generation unit 205 performs an image pair generating process on the inspection image read in step S201. A method for generating an image pair may be similar to the method performed for a learning image in the model learning phase. In addition, the image pair generation unit 205 stores an image pair of the central portion-removed patch image and the central portion image obtained from an inspection image in the inspection target image pair storage unit 207.

In step S203, the normal product image reproducing unit 210 reads an image pair of inspection images from the inspection target image pair storage unit 207, and reproduces a central portion of a normal product image from the central portion-removed patch image of the image pair. The normal product image reproducing unit 210 reads a reproduction model from the reproduction model storage unit 209. As shown in FIG. 5, the normal product image reproducing unit 210 inputs a central portion-removed patch image ($IMr_3$) generated from an inspection image to the reproduction model, and outputs a normal product reproduction image ($IMc_4$) that is a central portion of a normal product image. In addition, the normal product image reproducing unit 210 stores the generated normal product reproduction image in the normal product reproduction image storage unit 211 in association with an identifier and the like of a reproducing image of an inspection image used for reproduction.

In step S204, the defective product detecting unit 212 computes a difference between a normal product reproduction image generated in step S203 and a central portion of an image pair of inspection images read from the inspection target image pair storage unit 207, and determines whether the comparison region image is in a normal condition or in an anomaly condition on the basis of the magnitude of the obtained difference.

For example, in a case where it is determined that any one of comparison region images acquired from one inspection image is in an anomaly condition, the defective product detecting unit 212 may detect a subject of the inspection image as a defective product, and may specify an acquisition position of the comparison region image determined to be in an anomaly condition as a defective portion.

As described above, also in the present exemplary embodiment, an image closer to a normal product can be reproduction for an inspection image, and therefore a defective product can be detected with high accuracy.

Figure 9:
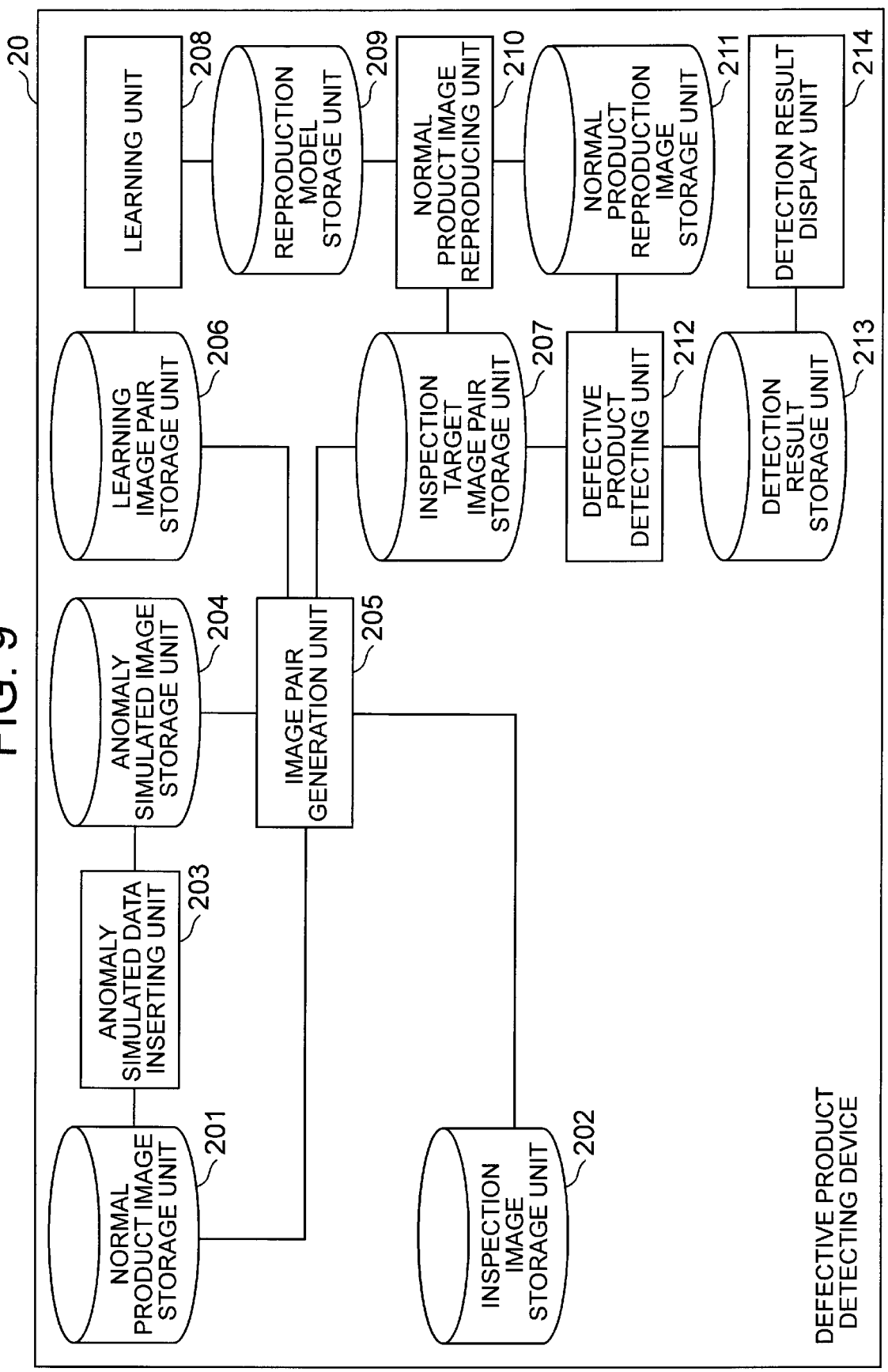
FIG. 9 is a block diagram showing another configuration example of the defective product detecting device according to the second exemplary embodiment.

In addition, FIG. 9 is a block diagram showing another configuration example of the defective product detecting device according to the second exemplary embodiment. As shown in FIG. 9, the defective product detecting device 20 may further include a detection result storage unit 213 and a detection result display unit 214.

The detection result storage unit 213 holds a detection result of the defective product detecting unit 212. The detection result storage unit 213 may hold, for example, information containing a fact that a comparison region image is determined not to be an image of a normal product by the defective product detecting unit 212 and information indicating the position of the comparison region image.

The detection result display unit 214 displays the detection result heled in the detection result storage unit 213.

This makes it possible to display not only a result of determining whether a product is a normal product or a defective product but also a defective portion.

In addition, in each of the above exemplary embodiments, the reproduction model has been described as a model for reproducing (restoring) a comparison region image in a normal condition from a reproducing image not containing a comparison region of an inspection image, but the reproduction model is not limited to this model. For example, the reproduction model may be a model reproducing a comparison region image in a normal condition or a patch image containing a comparison region image in a normal condition from a reproducing image containing a comparison region of an inspection image. In this case, in a subsequent determination process, by comparing a reproduction image with a partial image in the same region as the reproduction image of an inspection image, it is only required to determine whether the partial image (more specifically, an object for inspection appearing in the partial image) is in a normal condition or in an anomaly condition.

FIG. 10 is an explanatory diagram showing another example of the model learning process. In the example shown in FIG. 10, in an image pair generating process, using a copy of a part (for example, a central portion) of a first patch image ($IMp_1$) that is a patch image of a normal image as a comparison region image ($IMc_1$) and using an original patch image ($IMp_1$) as a reproducing image ($IMr_1$=$IMp_1$), a first image pair is generated. As for a second patch image ($IMp_2$) that is a patch image of an anomaly simulated image generated from the normal image, similarly, using a copy of a partial region (a central portion as in the above) of a patch image ($IMp_2$) as a comparison region image ($IMc_2$) and using an original patch image ($IMp_2$) as a reproducing image ($IMr_2$=$IMp_2$), a second image pair is generated. Thereafter, the learning unit 13 may learn a reproduction model using not only training data in which the reproducing image ($IMr_1$=$IMp_1$) in the first image pair is used as input data and the comparison region image ($IMc_1$) in the first image pair is used as teacher data but also training data in which the reproducing image ($IMr_2$=$IMp_2$) in the second image pair is used as input data and the comparison region image ($IMc_1$) in the first image pair is used as teacher data (see FIG. 10).

In addition, FIG. 11 is an explanatory diagram showing another example of the anomaly detecting process. For example, in a case where the model learning process shown in FIG. 10 is performed, in the anomaly detecting process, as shown in FIG. 11, by comparing a reproduction image ($IMc_4$) that is a comparison region image in a normal condition obtained by inputting an original patch image ($IMr_3$=$IMp_3$) that is a reproducing image to a reproduction model with a comparison region image ($IMc_3$) obtained by copying a part (for example, a central portion) of a patch image ($IMp_3$) obtained from an inspection image, it may be determined whether a comparison region image ($IMc_3$) in the inspection image is in a normal condition or in an anomaly condition.

Figure 12:
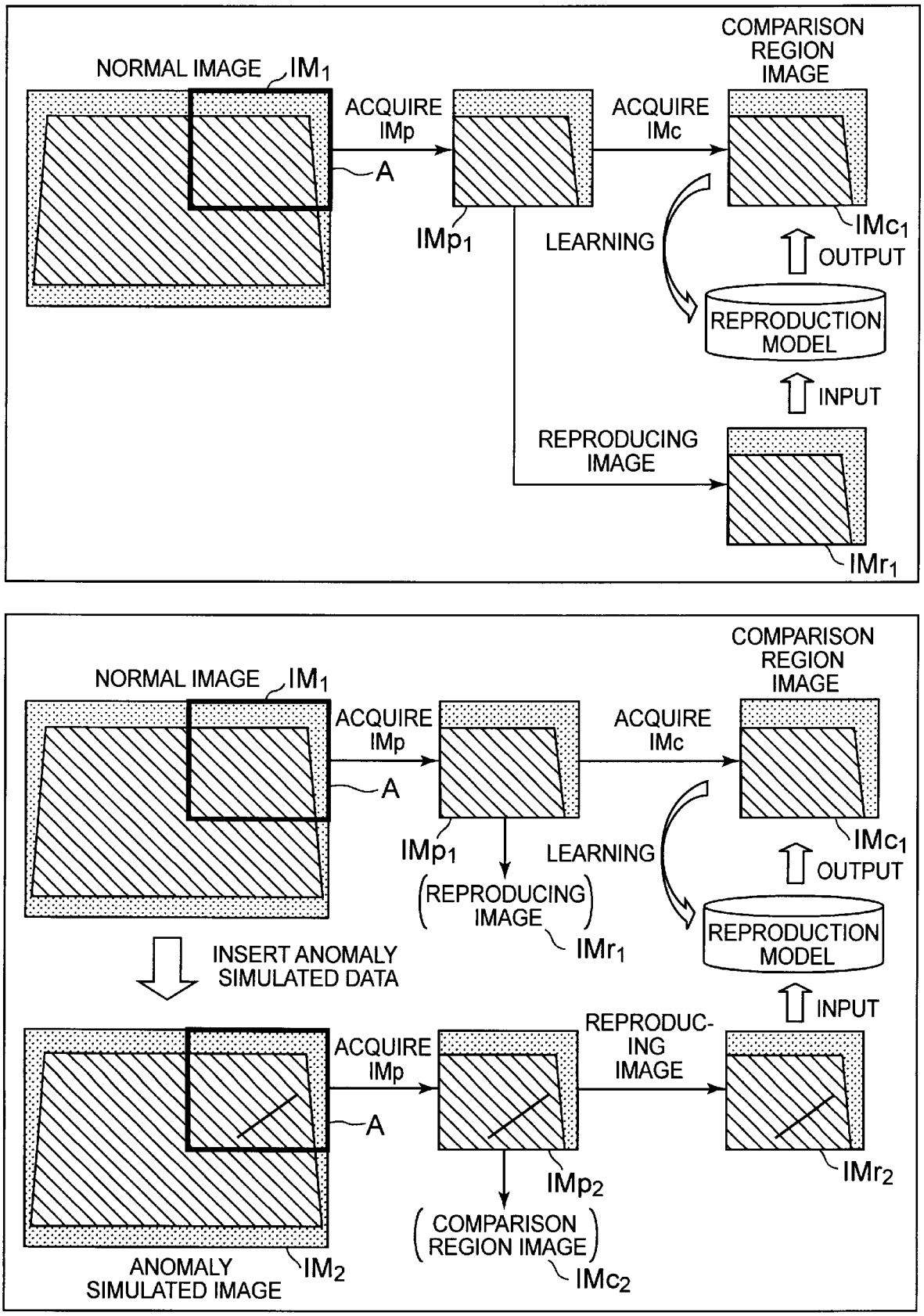
FIG. 12 is an explanatory diagram showing another example of the model learning process.

In addition, FIG. 12 is an explanatory diagram showing another example of the model learning process. In the example shown in FIG. 12, in the image pair generating process, using a first patch image ($IMp_1$) that is a patch image of a normal image as it is as a comparison region image ($IMc_1$=$IMp_1$) and a reproducing image ($IMr_1$=$IMp_1$), a first image pair is generated. As for a second patch image ($IMp_2$) that is a patch image of an anomaly simulated image generated from the normal image, similarly, using a patch image ($IMp_2$) as it is as a comparison region image ($IMc_2$=$IMp_2$) and a reproducing image ($IMr_2$=$IMp_2$), a second image pair is generated. Thereafter, the learning unit 13 may learn a reproduction model using not only training data in which the reproducing image ($IMr_1$=$IMp_1$) in the first image pair is used as input data and the comparison region image ($IMc_1$=$IMp_1$) in the first image pair is used as teacher data but also training data in which the reproducing image ($IMr_2$=$IMp_2$) in the second image pair is used as input data and the comparison region image ($IMc_1$=$IMp_1$) in the first image pair is used as teacher data (see FIG. 12).

In addition, FIG. 13 is an explanatory diagram showing another example of the anomaly detecting process. For example, in a case where the model learning process shown in FIG. 12 is performed, in the anomaly detecting process, as shown in FIG. 13, by comparing a reproduction image ($IMc_4$) that is a patch image in a normal condition obtained by inputting an original patch image ($IMr_3$=$IMp_3$) that is a reproducing image to a reproduction model with a comparison region image (IMc$_3$=IMp$_3$) that is a patch image (IMp$_3$) obtained from an inspection image, it may be determined whether a comparison region image (IMc$_3$=IMp$_3$) in the inspection image is in a normal condition or in an anomaly condition.

Even in such a case, using a reproduction model learned using not only a normal image but also an anomaly simulated image, and a part of an inspection image containing an object for inspection (reproducing image), a reproduction image reproduction by estimating a normal condition of at least a predetermined region (inspection target region) of the object for inspection is generated. Therefore, non-defect/defect of the object for inspection can be determined with high accuracy. For example, as a part of an inspection image, a patch image containing at least a predetermined region may be acquired, or a reproducing image containing a predetermined region or containing at least a part of a region in contact with the predetermined region may be acquired. Even in such a case, using the above reproduction model, a reproduction image containing at least a predetermined region of an object for inspection in a normal condition can be acquired from the acquired image. Therefore, by comparing the reproduction image with a determination target image that is an image in the same region as the reproduction image in the inspection image, non-defect/defect of the object for inspection can be determined with high accuracy.

Figure 14:
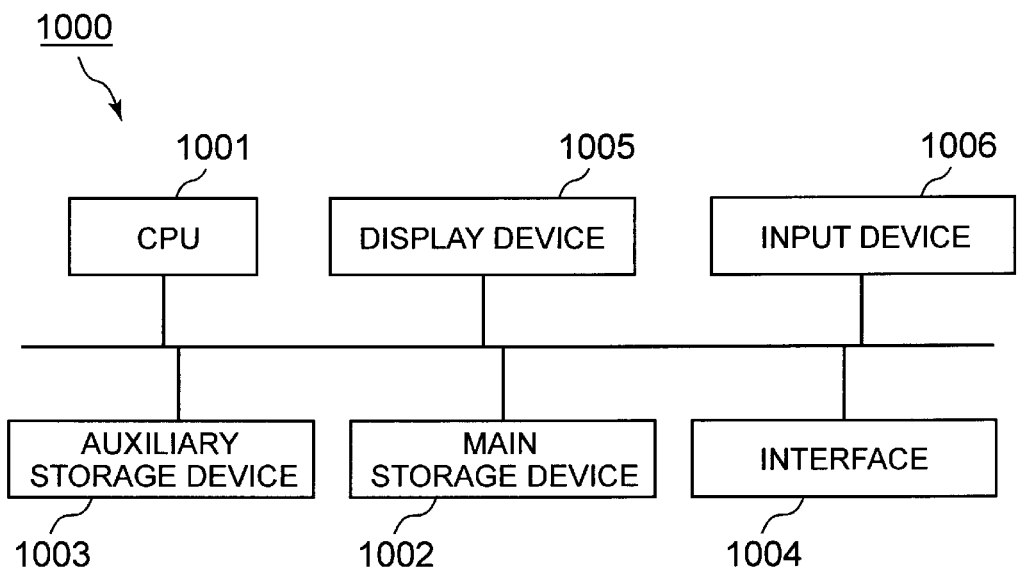
FIG. 14 is a schematic block diagram showing a configuration example of a computer according to an exemplary embodiment of the present invention.

In addition, FIG. 14 is a schematic block diagram showing a configuration example of a computer according to an exemplary embodiment of the present invention. A computer 1000 includes a CPU 1001, a main storage device 1002, an auxiliary storage device 1003, an interface 1004, a display device 1005, and an input device 1006.

Each of the exemplary embodiments described above may be mounted on the computer 1000. In this case, operation of the device may be stored in the auxiliary storage device 1003 in a form of a program. The CPU 1001 reads out a program from the auxiliary storage device 1003, expands the program in the main storage device 1002, and performs a predetermined process in each of the exemplary embodiments according to the program. Note that the CPU 1001 is an example of an information processing device that operates according to a program. In addition to the central processing unit (CPU), for example, a micro processing unit (MPU), a memory control unit (MCU), or a graphics processing unit (GPU) may be included.

The auxiliary storage device 1003 is an example of a non-transitory tangible medium. Other examples of the non-transitory tangible medium include a magnetic disk connected through the interface 1004, a magneto-optical disk, a CD-ROM, a DVD-ROM, and a semiconductor memory. In addition, in a case where a program is distributed to the computer 1000 via a communication line, the computer 1000 that has received the distribution may expand the program in the main storage device 1002 and may execute a predetermined process in each of the exemplary embodiments.

In addition, the program may be for implementing some of predetermined processes in the exemplary embodiments. Furthermore, the program may be a difference program that implements a predetermined process in the exemplary embodiments in combination with another program already stored in the auxiliary storage device 1003.

The interface 1004 transmits/receives information to/from another device. In addition, the display device 1005 presents information to a user. In addition, the input device 1006 receives input of information from a user.

In addition, some elements of the computer 1000 can be omitted depending on processing contents in the exemplary embodiments. For example, the display device 1005 can be omitted if the computer 1000 does not present information to a user. For example, if the computer 1000 does not receive input of information from a user, the input device 1006 can be omitted.

In addition, some or all of the above components are implemented by a general-purpose or dedicated circuitry, a processor, or a combination thereof. These components may be constituted by a single chip or a plurality of chips connected to each other via a bus. In addition, some or all of the above components may be implemented by a combination of the above-described circuitry and the like and a program.

In a case where some or all of the above components are implemented by a plurality of information processing devices, circuitries, and the like, the plurality of information processing devices, circuitries, and the like may be arranged in a concentrated manner or a distributed manner. For example, the information processing device, the circuitry, and the like may be implemented as a form in which a client and server system, a cloud computing system, and the like are connected to each other via a communication network.

Figure 15:
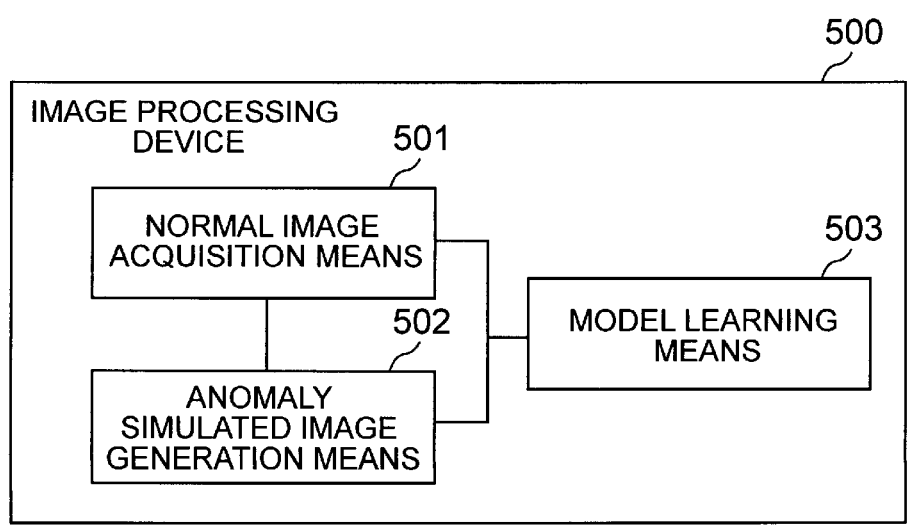
FIG. 15 is a block diagram showing an outline of an image processing device of the present invention.

Next, an outline of the present invention will be described. FIG. 15 is a block diagram showing an outline of an image processing device of the present invention. An image processing device 500 shown in FIG. 15 includes a normal image acquisition means 501, an anomaly simulated image generation means 502, and a model learning means 503.

The normal image acquisition means 501 acquires a normal image including an object for inspection in a normal condition.

The anomaly simulated image generation means 502 inserts, into the normal image, a simulated image of an anomaly feature of the object for inspection in an anomaly condition to generate an anomaly simulated image.

The model learning means 503, using the normal image and the anomaly simulated image, learns a reproduction model for generating, from part of an image containing the object for inspection, a reproduction image is an image including at least a predetermined region of the object for inspection in which the predetermined region in a normal condition is reproduced.

With such a configuration, even in a case where it is difficult to collect an image of an object that is not in a normal condition for learning, it is possible to obtain, without trouble, a reproduction model that can generate, with high accuracy, a reproduction image that is an image containing at least a predetermined region of the object for inspection and reproduces the predetermined region in a normal condition from a part of an image containing the object for inspection. Therefore, by obtaining a reproduction image in a normal condition containing a predetermined region of an object for inspection from a part of an inspection image using such a reproduction model and comparing the reproduction image with an image in the same region as the reproduction image in the inspection image, an influence by an individual difference of an image can be reduced, and non-defect/defect of an object for inspection can be determined with high accuracy.

Hereinabove, the invention of the present application has been described with reference to the present exemplary embodiment and examples, but the invention of the present application is not limited to the above-described exemplary embodiments and examples. Various modifications that can be understood by a person skilled in the art can be made to the configuration and details of the invention of the present application within the scope of the invention of the present application.

This application claims a priority based on Japanese Patent Application No. 2018-064097 that was filed on Mar. 29, 2018, and incorporates the entire disclosure thereof herein.

INDUSTRIAL APPLICABILITY

The present invention can be preferably applied to, for example, defective product inspection that classifies products into a normal product and a defective product.

REFERENCE SIGNS LIST

10 Image processing device
11 Anomaly simulated data inserting unit
12 Image pair generation unit
13 Learning unit
14 Data storage unit
15 Image reproduction unit
16 Determination unit
20 Defective product detecting device
201 Normal product image storage unit
202 Inspection image storage unit
203 Anomaly simulated data inserting unit
204 Anomaly simulated image storage unit
205 Image pair generation unit
206 Learning image pair storage unit
207 Inspection target image pair storage unit
208 Learning unit
209 Reproduction model storage unit
210 Normal product image reproducing unit
211 Normal product reproduction image storage unit
212 Defective product detecting unit
213 Detection result storage unit
214 Detection result display unit
1000 Computer
1001 CPU
1002 Main storage device
1003 Auxiliary storage device
1004 Interface
1005 Display device
1006 Input device
500 Image processing device
501 Normal image acquisition means
502 Anomaly simulated image generation means
503 Model learning means

What is claimed is:

1. An image processing device comprising:
a normal image acquisition unit which acquires a normal image including an object for inspection in a normal condition;
an anomaly simulated image generation unit which inserts, into the normal image, a simulated image of an anomaly feature of the object for inspection in an anomaly condition to generate an anomaly simulated image; and
a model learning unit which learns, using the normal image and the anomaly simulated image, a reproduction model for generating a reproduction image from part of an image including the object for inspection, wherein the reproduction image includes at least a predetermined region of the object for inspection and the predetermined region in the normal condition is reproduced.

2. The image processing device according to claim 1, wherein
the model learning unit learns the reproduction model using a pair of the normal image and an anomaly simulated image generated from the normal image.

3. The image processing device according to claim 1, wherein
the model learning unit learns the reproduction model using training data in which a first image containing a predetermined region contained in the normal image is used as teacher data and a second image containing the predetermined region in the normal image or containing at least a part of a region in contact with the predetermined region is used as input data, and training data in which the first image is used as teacher data and a third image containing the same region as the second image in the anomaly simulated image generated from the normal image is used as input data.

4. The image processing device according to claim 1, comprising:
an inspection image acquisition unit which acquires an inspection image containing the object for inspection;
a normal image reproducing unit which acquires, using the reproduction model, a reproduction image containing at least the predetermined region of the object for inspection in a normal condition from a part of the inspection image; and
a determination unit which compares the reproduction image with a determination target image that is an image in the same region as the reproduction image in the inspection image to determine whether the determination target image is in a normal condition or in an anomaly condition.

5. The image processing device according to claim 4, comprising an image pair generation unit which acquires a comparison region image containing at least the predetermined region, and a reproducing image containing the predetermined region or containing at least a part of a region in contact with the predetermined region from a patch image containing at least the predetermined region in an input image when the normal image, the anomaly simulated image, and the inspection image are input to the image pair generation unit, and generates an image pair, wherein
the model learning unit learns the reproduction model using training data in which the reproducing image of a first image pair that is the image pair generated from the normal image is used as input data and the comparison region image of the first image pair is used as teacher data, and training data in which the reproducing image of a second image pair that is an image pair generated from the anomaly simulated image generated from the normal image is used as input data and the comparison region image of the first image pair is used as teacher data,
the normal image reproducing unit inputs the reproducing image of a third image pair that is the image pair generated from the inspection image to the reproduction model to acquire a reproduction image that is an image in the same region as the comparison region image of the third image pair and corresponds to the comparison region image in a normal image, and
the determination unit compares the reproduction image with the comparison region image of the third image pair to determine whether the comparison region image of the third image pair is in a normal condition or in an anomaly condition.

6. The image processing device according to claim 5, wherein
the image pair generation unit generates, from a patch image containing the predetermined region and at least a part of a region in contact with the predetermined region, an image pair containing a comparison region image that is an image obtained by cutting out the predetermined region and a reproducing image that is an image obtained by removing the comparison region image from the patch image, or generates, from the patch image, an image pair containing a comparison region image that is an image obtained by cutting out the predetermined region and the reproducing image that is the same image as the patch image, or generates, from the patch image in the same region as the predetermined region, an image pair containing a comparison region image and a reproducing image, which are both the same image as the patch image.

7. The image processing device according to claim 1, wherein
the anomaly simulated image generation unit generates the anomaly simulated image by a method predetermined for each type of anomaly.

8. The image processing device according to claim 1, wherein
the anomaly simulated image generation unit generates the anomaly simulated image using a linear, polygonal, or circular image or a noise.

9. An image processing method, executed by an information processing device, comprising:
acquiring a normal image including an object for inspection in a normal condition,
inserting, into the normal image, a simulated image of an anomaly feature of the object for inspection in an anomaly condition to generate an anomaly simulated image, and
learning, using the normal image and the anomaly simulated image, a reproduction model for generating a reproduction image from part of an image including the object for inspection, wherein the reproduction image includes at least a predetermined region of the object for inspection and the predetermined region in the normal condition is reproduced.

10. A non-transitory computer-readable capturing medium having captured therein an image processing program for causing a computer to execute processes of:
acquiring a normal image including an object for inspection in a normal condition;
inserting, into the normal image, a simulated image of an anomaly feature of the object for inspection in an anomaly condition to generate an anomaly simulated image; and
learning, using the normal image and the anomaly simulated image, a reproduction model for generating a reproduction image from part of an image including the object for inspection, wherein the reproduction image includes at least a predetermined region of the object for inspection and the predetermined region in the normal condition is reproduced.

* * * * *